United States Patent [19]

Fukushima et al.

[11] Patent Number: 5,305,106
[45] Date of Patent: Apr. 19, 1994

[54] IMAGE SIGNAL REPRODUCING APPARATUS HAVING A SYNCHRONIZING SIGNAL GENERATOR

[75] Inventors: Nobuo Fukushima; Shigeo Yamagata, both of Yokohama; Makoto Ise, Tokyo, all of Japan

[73] Assignee: Canon Kabushiki Kaisha, Tokyo, Japan

[21] Appl. No.: 585,527

[22] Filed: Sep. 20, 1990

[30] Foreign Application Priority Data

Sep. 20, 1989 [JP] Japan .................. 1-245590
Sep. 20, 1989 [JP] Japan .................. 1-245591
Sep. 20, 1989 [JP] Japan .................. 1-245592
Sep. 20, 1989 [JP] Japan .................. 1-245593

[51] Int. Cl.⁵ .................. H04N 5/04; H04N 5/06
[52] U.S. Cl. .................. 348/521; 348/500
[58] Field of Search .............. 358/153, 148, 150, 151, 358/152, 154, 155, 156, 158, 159, 335, 337, 320, 330; H04N 5/08, 5/06, 5/04

[56] References Cited

U.S. PATENT DOCUMENTS

| | | |
|---|---|---|
| 4,121,242 | 10/1978 | Janko . |
| 4,549,229 | 10/1985 | Nakano et al. . |
| 4,688,094 | 8/1987 | Tanabe et al. .............. 358/148 |
| 4,729,024 | 3/1988 | Kawai et al. . |
| 4,764,810 | 8/1988 | Srivastava . |
| 4,766,506 | 8/1988 | Yagi et al. . |
| 4,777,538 | 10/1988 | Kwak . |

FOREIGN PATENT DOCUMENTS

| | | |
|---|---|---|
| 0166428 | 1/1986 | European Pat. Off. . |
| 0289046 | 11/1988 | European Pat. Off. . |
| 84201253 | 3/1984 | PCT Int'l Appl. . |
| 2086177 | 5/1982 | United Kingdom . |

OTHER PUBLICATIONS

Pat. Abs. Japan, vol. 10, No. 67, Jul. 1986 for JP 14 A-61-50-473.
Pat. Abs. Japan, vol. 6, No. 67, Apr. 1982 for JP-A-5-7-9184.
Pat. Abs. Japan, vol. 8, No. 60, Mar. 1984 for JP-A-5-8-208905.
Pat. Abs. Japan, vol. 9, No. 136, Jun. 1985 for JP-A-6-0-018077.

Primary Examiner—James J. Groody
Assistant Examiner—Michael H. Lee
Attorney, Agent, or Firm—Fitzpatrick, Cella, Harper & Scinto

[57] ABSTRACT

An image signal reproducing apparatus includes a synchronizing signal generator which is configured so as to count the number of clocks of a generated clock signal, generate various kinds of timing signals in accordance with the result of count, compare the phase of the generated timing signal with the phase of an input synchronizing signal, and control a period to count the number of clocks of the clock signal in accordance with the result of comparison. It becomes thereby possible to form various kinds of correct timing signals even if the input synchronizing signal reproduced from a recording medium is deteriorated.

8 Claims, 18 Drawing Sheets

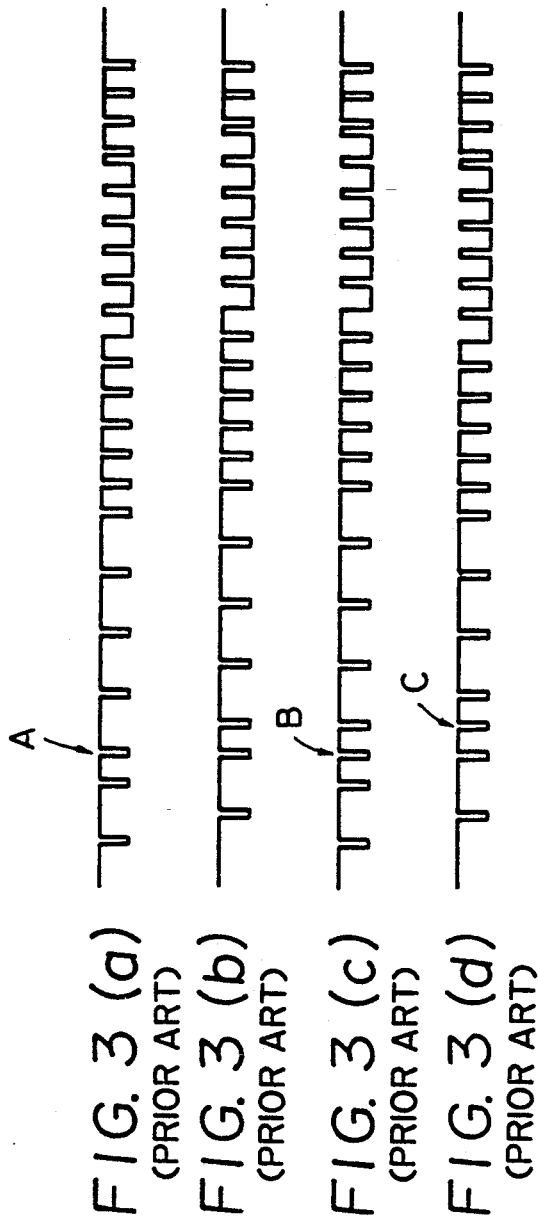

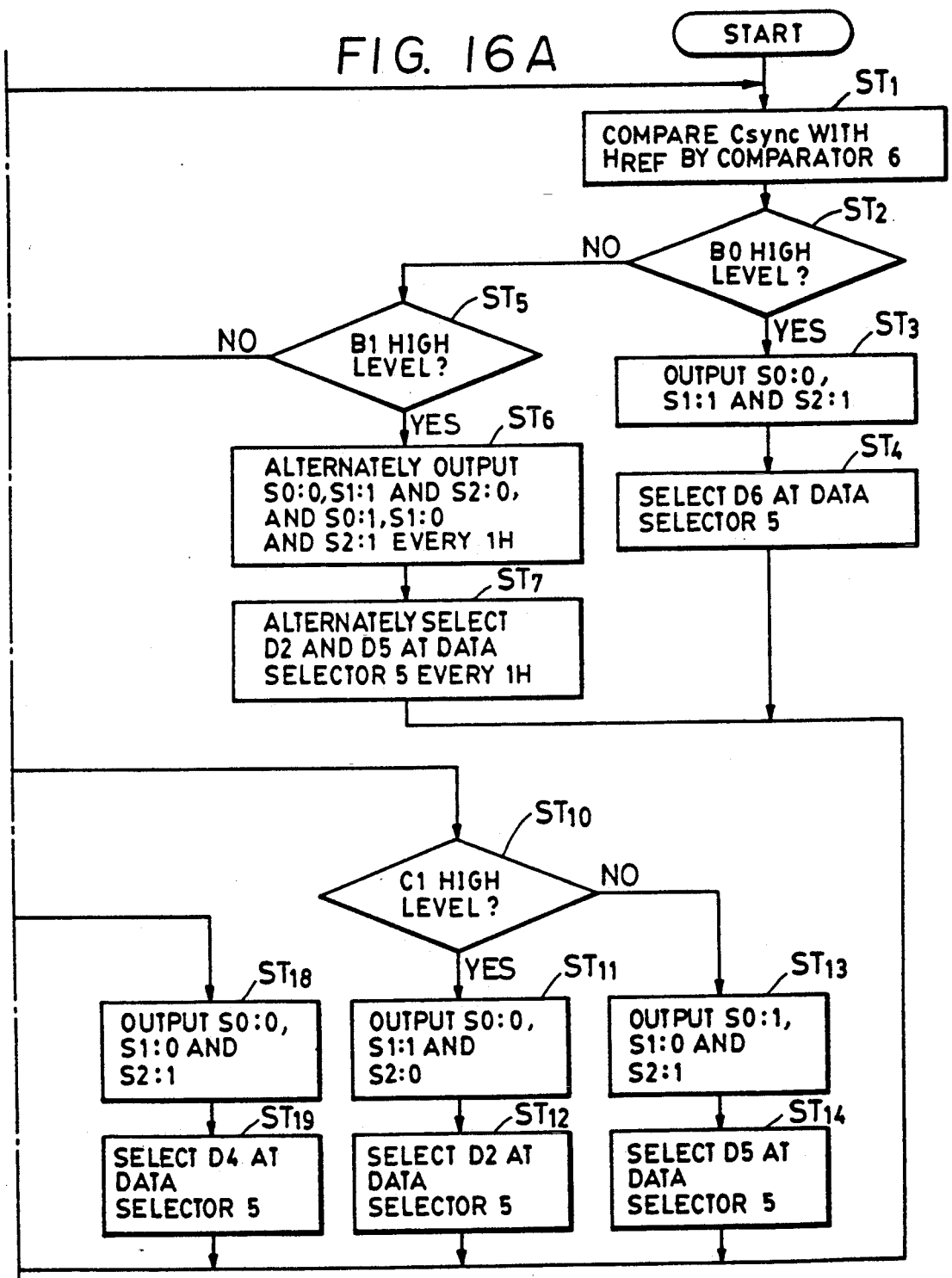

IMAGE SIGNAL REPRODUCING APPARATUS HAVING A SYNCHRONIZING SIGNAL GENERATOR

BACKGROUND OF THE INVENTION

1. Field of the Invention

This invention relates to an image signal reproducing apparatus having a synchronizing signal generator for generating various kinds of timing signals in accordance with synchronizing signals recorded on a recording medium together with information signals.

2. Description of the Prior Art

There have been information signal recording and reproducing apparatuses in which synchronizing signals are recorded on a recording medium together with information signals when recording. The synchronizing signals recorded on the recording medium together with the information signals are reproduced when reproducing, various kinds of timing signals are generated in accordance with the reproduced synchronizing signals, and various kinds of processings are performed using the reproduced information signals in accordance with the generated timing signals.

In the above-described information signal recording and reproducing apparatuses, information signals to be recorded and reproduced are, for example, television signals.

As the current scanning method for television signals, a 2:1 interlaced scanning method is generally used in which scanning is performed by jumping every other scanning line. In the NTSC method, for example, interlaced scanning for television signals is performed so that scanning lines mutually interlace every 1/60 second, and a frame image for one picture frame is provided every 1/30 second using two field images each formed by a single interlaced scanning operation.

As described above, in the television signal in the NTSC method, one picture frame is provided by two field images. The single picture frame comprises 525 scanning lines.

A composite synchronizing signal ($C_{sync}$) composed of a horizontal synchronizing signal ($H_{sync}$) indicating one horizontal scanning period and a vertical synchronizing signal ($V_{sync}$) indicating one vertical scanning period is added to the above-described television signal, and continuity of the synchronous signals is maintained at the boundary of consecutive field periods.

As an apparatus for recording the above-described television signals on a recording medium, such as a magnetic disk or the like, and reproducing the signals from the medium, there has been used a still video recording and reproducing apparatus, In the still video recording and reproducing apparatus, a magnetic disk, serving as a recording medium, is rotated at a speed of 3600 rpm, an image signal for one field is recorded on one of a plurality of tracks concentrically formed on the magnetic disk, and the recorded image signal for one field is repeatedly reproduced to obtain a still picture image signal.

When reproducing the still picture image signal as described above, in order to conform to the above-described television-signal scanning method, an image signal for one field is delayed by ½ the horizontal synchronizing period (½ H) except for the vertical synchronizing period using a ½ H delay device, and an image signal delayed by the delay device and an undelayed image signal are output by being alternately switched at every one field period. Thus, a so-called skew compensation processing is performed which conforms to the above-described interlaced scanning while maintaining the continuity of the horizontal synchronizing signal.

FIG. 1 is a digram showing the schematic configuration of a conventional still video reproducing apparatus. The operation of the conventional still video reproducing apparatus will now be explained.

In FIG. 1, a magnetic disk 100 is rotated by a motor 101 at a speed of 3600 rpm. Signals recorded on tracks formed on the magnetic disk 100 by a magnetic head 102 are reproduced and supplied to a reproducing amplifier 103.

A signal reproduced by the magnetic head 102 is amplified to an amplitude level for practical use by the reproducing amplifier 103. The amplified signal is supplied to a demodulation circuit 104, whereby the signal is demodulated. An image signal for one field to which a composite synchronizing signal has been added is then output and supplied to a synchronizing signal separation circuit 105 and an image signal processing circuit 107.

The synchronizing signal separation circuit 105 separates the composite synchronizing signal from the signal supplied from the demodulation circuit 104. The separated composite synchronizing signal is supplied to a timing signal generation circuit 106 and a synchronizing signal addition circuit 108.

A magnetic piece (PG pin) 107 for detecting the rotation phase of the magnetic disk 100 is provided on a circumference on the core of the magnetic disk 100. Every time the PG pin 107 crosses over a PG coil 108 due to the rotation of the magnetic disk 100, a pulse signal is output from the PG coil 108. The pulse signal output from the PG coil 108 is subjected to waveform shaping by a waveform shaping circuit 109, and then is supplied to the timing signal generation circuit 106 as a PG pulse signal synchronizing with the rotation phase of the magnetic disk 100.

An image signal recorded on each track on the magnetic disk 100 is recorded so that the added vertical synchronizing signal is situated at a position deviated by $7H \pm 2H$ in the circumferential direction from the position where the PG pin 107 is provided.

The timing signal generation circuit 106 forms a blanking signal B and a skew compensation gate signal S in synchronization with the composite synchronizing signal supplied from the synchronizing signal separation circuit 105 and the PG pulse signal supplied from the waveform shaping circuit 109. The blanking signal B and the skew compensation gate signal S thus formed are supplied to an image signal processing circuit 110 and a change-over switch 113 (to be described later), respectively. The image signal processing circuit 110 performs horizontal and vertical blanking processings for the image signal supplied from the demodulation circuit 104 in accordance with the blanking signal B supplied from the timing signal generation circuit 106, and supplies the resultant signal to a synchronizing signal addition circuit 111.

The synchronizing signal addition circuit 111 adds the composite synchronizing signal separated from the synchronizing signal separation circuit 105 to the image signal for one field subjected to the blanking processings in the image signal processing circuit 110 in the preceding stage, and supplies the resultant signal to a ½ H delay circuit 112 and terminal "a" of the change-over switch 113. The ½ H delay circuit 112 delays the supplied image signal by a period of ½ H, and supplies the delayed image signal to terminal "b" of the change-over switch 113.

By alternately switching the connection between the side of terminal "a" and the side of terminal "b" at every one-field period in accordance with the skew compensation gate signal S output from the timing signal generation circuit 106, a frame image signal conforming to the interlaced scanning method is output from the change-over switch 113 via an output terminal 114.

FIGS. 2(a) and 2(b) show an example of the configuration of a synchronizing signal generator in the above-described still video recording and reproducing apparatus, and a timing chart indicating the operation thereof, respectively.

FIG. 2(a) is a diagram showing the configuration of a synchronizing signal generator for generating window pulses ($H_{BLK}$) for providing horizontal blanking periods in the reproduced still-picture image signal in the still video recording and reproducing apparatus.

In the still video recording and reproducing apparatus, a signal $C_{sync}$ (see FIG. 2(b)) reproduced when reproducing is supplied to reset terminal RES of a counter 300 shown in FIG. 2(a).

The counter 300 is reset during a low-level period of the signal $C_{sync}$ supplied from the terminal RES, performs counting from a leading edge ($T_0$ in FIG. 2(b)) of the signal $C_{sync}$ for a predetermined period ($T_2$ in FIG. 2(b)), and supplies AND gates 301 and 302 with count data.

The AND gate 301 detects whether or not output count data from the counter 300 have reached $T_1$ from $T_0$ in FIG. 2(b), and outputs a high-level signal when data have reached $T_1$. The AND gate 302 detects whether or not the output count data from the counter 300 have reached $T_2$ from $T_1$ in FIG. 2(b), and outputs a high-level signal when the data have reached $T_2$.

Signals output from the AND gates 301 and 302 are supplied to set terminal S and reset terminal R of an S-R flip-flop 303, respectively. As a result, window pulses $H_{BLK}$ as shown in FIG. 2(b) are output from output terminal Q of the S-R flip-flop 303. In the still video recording and reproducing apparatus, horizontal blanking periods are provided in the still-picture image signal in accordance with the pulses $H_{BLK}$ formed as described above.

In the prior art as described above, however, a point to start recording for an image signal recorded on a magnetic disk and a horizontal synchronizing signal obtained from an image signal reproduced from the magnetic disk do not always maintain a constant phase relation. Furthermore, variations exist among reproduced magnetic disks in positional relation between the point to start recording of an image signal and the switching point between a signal delayed by ½ H from the image signal reproduced from the magnetic disk and an undelayed signal in skew compensation, that is, the position of a PG pin. Hence, when the signal delayed by ½ H from the image signal reproduced from the magnetic disk and the undelayed signal are switched at the position of the PG pin for the purpose of skew compensation, the phase between the point to start recording of the image signal recorded on the magnetic disk and the horizontal synchronizing signal obtained from the image signal reproduced from the magnetic disk is different for every magnetic disk.

FIG. 3, composed of FIGS. 3(a)–3(d), illustrates a timing charts indicating the waveforms of synchronizing signals added to an image signal reproduced from a magnetic disk for the purpose of explaining the above-described problem.

FIG. 3(a) is a diagram continuously showing a synchronizing signal added to an image signal reproduced from a magnetic disk, wherein point A indicates a point to start recording. FIG. 3(b) shows a signal delayed by ½ H from the signal shown in FIG. 3(a).

Skew compensation is performed by switching the signals shown in FIGS. 3(a) and 3(b) every time the magnetic disk performs a single rotation. FIG. 3(c) shows a waveform when the signal shown in FIG. 3(a) is switched to the signal shown in FIG. 3(b), and FIG. 3(d) shows a waveform when the signal shown in FIG. 3(b) is switched to the signal shown in FIG. 3(a).

As shown in FIGS. 3(c) and 3(d), extra pulses as shown by points B and C are produced when skew compensation is performed, and the continuity of the horizontal synchronizing signal is not maintained at these points in the prior art.

Furthermore, in the conventional apparatus, when the track to be reproduced is changed from an unrecorded track to a recorded track, or from a track on which an image signal corresponding to an odd-numbered field is recorded to a track on which an image signal corresponding to an even-numbered field is recorded (or vice versa), discontinuity of the horizontal synchronizing signal occurs in the reproduced still-picture image signal. For example, when the reproduced still-picture image signal is supplied to an external apparatus, such as a monitoring apparatus or the like, the external apparatus operates in accordance with the synchronizing signal added to the supplied still-picture image signal. Since the added horizontal synchronizing signal is discontinuous, there is the possibility that the picture frame made from the supplied still-picture image will be disturbed.

Moreover, since the composite synchronizing signal added to the reproduced image signal is reproduced from the magnetic disk, there is the possibility that a part of the composite synchronizing signal will be missing due to dropouts caused by the adherence of dust, scratches and the like, or that the signal will be deteriorated due to the penetration of noise from the outside, uneven rotation of the magnetic disk and the like.

In the prior art, when an image signal reproduced from a magnetic disk by the above-described still video reproducing apparatus is displayed as a still picture using, for example, a monitoring apparatus, it is possible to display a stable still picture even if the composite synchronizing signal added to the reproduced image signal is deteriorated as described above, because an AFC (automatic frequency control) circuit is provided in the monitoring apparatus. However, when a reproduced image signal to which a deteriorated composite synchronizing signal has been added is input to an image input apparatus (for example, an image memory apparatus or the like) not having the AFC circuit, various kinds of synchronizing signals formed according to the deteriorated composite synchronizing signal also become incorrect. As a result, the reproduced still-picture image signal processed according to the incorrect synchronizing signals is also deteriorated. Hence, the input of a normal image signal was not performed in some cases.

SUMMARY OF THE INVENTION

It is an object of the present invention to provide an information signal reproducing apparatus having a synchronizing signal generator capable of solving the above-described problems.

It is a further object of the present invention to provide a synchronizing signal generator capable of producing various kinds of correct timing signals even from deteriorated synchronizing signals.

These objects are accomplished, according to one aspect of the present invention, by a synchronizing signal generator for forming various kinds of timing signals synchronizing with an input synchronizing signal, comprising a clock signal generator for generating clock signals, a counter for counting the clock signals generated by the clock signal generator and for outputting the result of count, a timing signal generator for generating various kinds of timing signals in accordance with the result of count by the counter, and a phase control circuit for comparing the phase of the timing signal generated by the timing signal generator with the phase of the input synchronizing signal and for controlling a count period in the counter in accordance with the result of comparison.

It is a still further object of the present invention to provide a synchronizing signal generator capable of generating various kinds of correct and stable timing signals even from unstable synchronizing signals.

This object is accomplished, according to another aspect of the present invention, by a synchronizing signal generator for forming various kinds of timing signals synchronizing with an input synchronizing signal, comprising a clock signal generator for generating clock signals, a first timing signal generator for counting the clock signals generated by the clock signal generator and for generating first timing signals in accordance the result of count, a second timing signal generator for counting the first timing signals generated by the first timing signal generator and for generating second timing signals in accordance with the result of count, and a control circuit for comparing the phase of the first timing signal generated by the first timing signal generator with the phase of an input first synchronizing signal, for controlling a count period in the first timing signal generator in accordance with the result of comparison, and for making the second timing signal generator in a free-running state for a predetermined period.

It is still another object of the present invention to provide an image signal reproducing apparatus capable of arranging the phase of a composite synchronizing signal so that it does not drastically change even when a switching operation between reproducing tracks is performed.

This object is accomplished, according to another aspect of the present invention, by an image signal reproducing apparatus for reproducing an image signal recorded on a recording medium, comprising reproducing means for reproducing the signal recorded on the recording medium, composite synchronizing signal forming means for separating a first composite synchronizing signal added to the signal reproduced by the reproducing means and for forming a second composite synchronizing signal synchronizing in phase with the separated first composite synchronizing signal, muting means for performing muting of the signal reproduced from the recording medium by the reproducing means, and response speed control means for changing a response speed for phase synchronizing control of the second composite synchronizing signal relative to the first composite synchronizing signal in the composite synchronizing signal forming means between during at least a part of the muting operation by the muting means and during the other period wherein the muting operation is not performed.

It is a still further object of the present invention to provide an image signal reproducing apparatus capable of maintaining continuity of horizontal synchronizing signals even after skew compensation processing.

According to another aspect, the present invention relates to an image signal reproducing apparatus for reproducing an image signal recorded on a recording medium, comprising reproducing means for reproducing an image signal recorded on the recording medium, composite synchronizing signal forming means for separating a first composite synchronizing signal from the image signal reproduced by the reproducing means and for forming a second composite synchronizing signal synchronizing in phase with the separated first composite synchronizing signal, composite synchronizing signal addition means for adding the second composite synchronizing signal in place of the first composite synchronizing signal added to the image signal reproduced from the recording medium by the reproducing means and for outputting the resultant signal, and skew compensation processing means for performing skew compensation for the image signal, to which the second composite synchronizing signal is added, output from the composite synchronizing signal addition means.

These and other objects and features of the present invention will become more apparent from the following detailed description of the invention by reference to the attached drawings.

BRIEF DESCRIPTION OF THE DRAWINGS

FIGS. 3(a)–3(d) are timing charts showing the waveforms of synchronizing signals added to an image signal reproduced from a magnetic disk;

DETAILED DESCRIPTION OF THE PREFERRED EMBODIMENTS

The present invention will now be explained by reference to embodiments of the invention.

Figure 4:
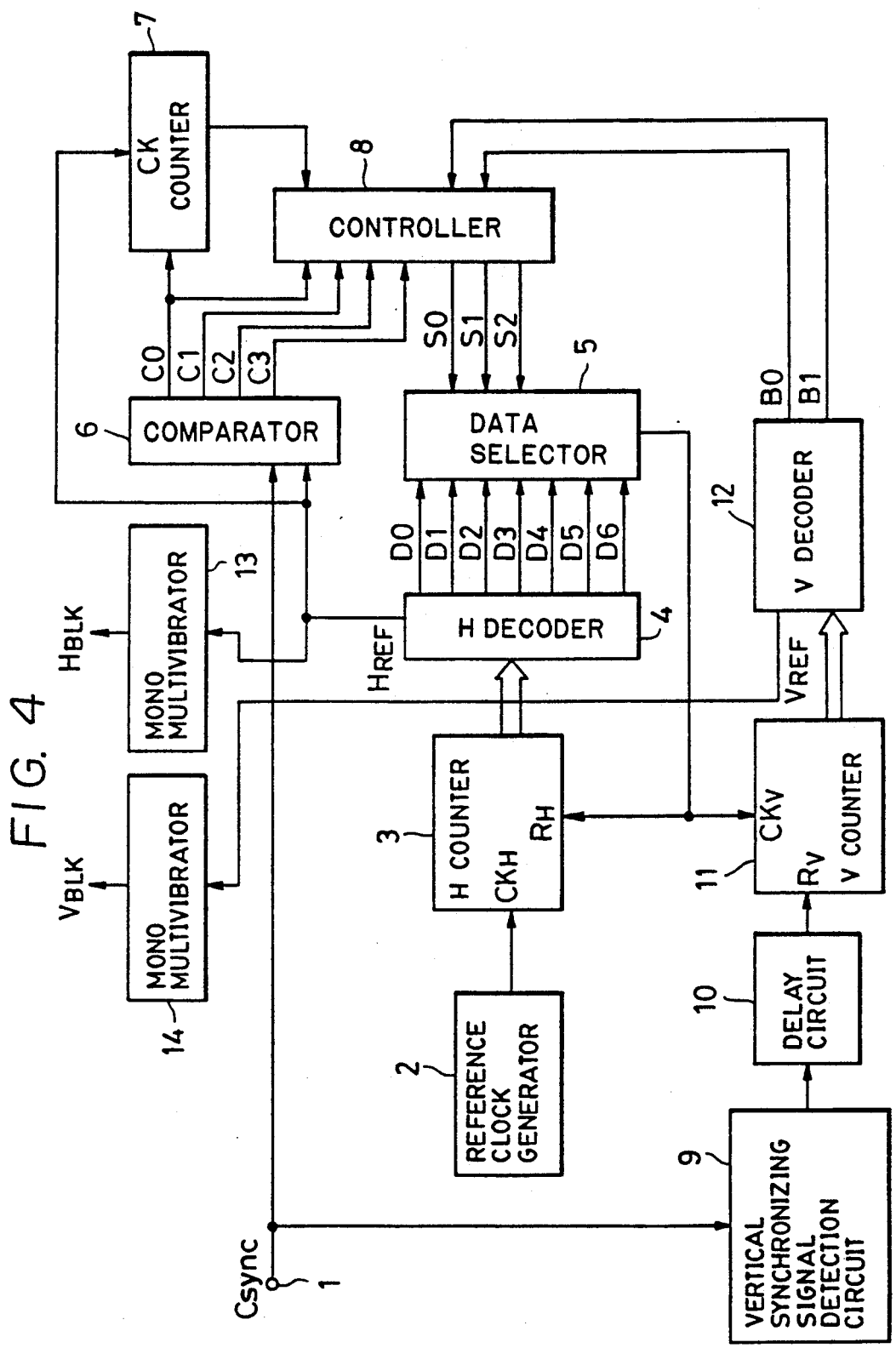
FIG. 4 is a diagram showing the schematic configuration of a synchronizing signal generator, representing a first embodiment of the present invention, in a still video recording and reproducing apparatus for handling still-picture image signals conforming to television signals of the NTSC system, serving as a first embodiment of the present invention.

FIG. 4 is a diagram showing the schematic configuration of a synchronizing signal generator, representing a first embodiment of the present invention, in a still video recording and reproducing apparatus for handling still-picture image signals conforming to television signals of the NTSC system.

In FIG. 4, a composite synchronizing signal $C_{sync}$ (see FIG. 5) reproduced from a magnetic disk (not shown) is input to input terminal 1, and is supplied to a comparator 6 (to be described later) and a vertical synchronizing signal detection circuit 9.

Clock pulses having the color subcarrier frequency (3.58 MHz (megahertz)) are generated from a reference clock generator 2, and are supplied to clock-pulse input terminal $CK_H$ of a horizontal synchronizing counter (H counter) 3.

Figure 5:
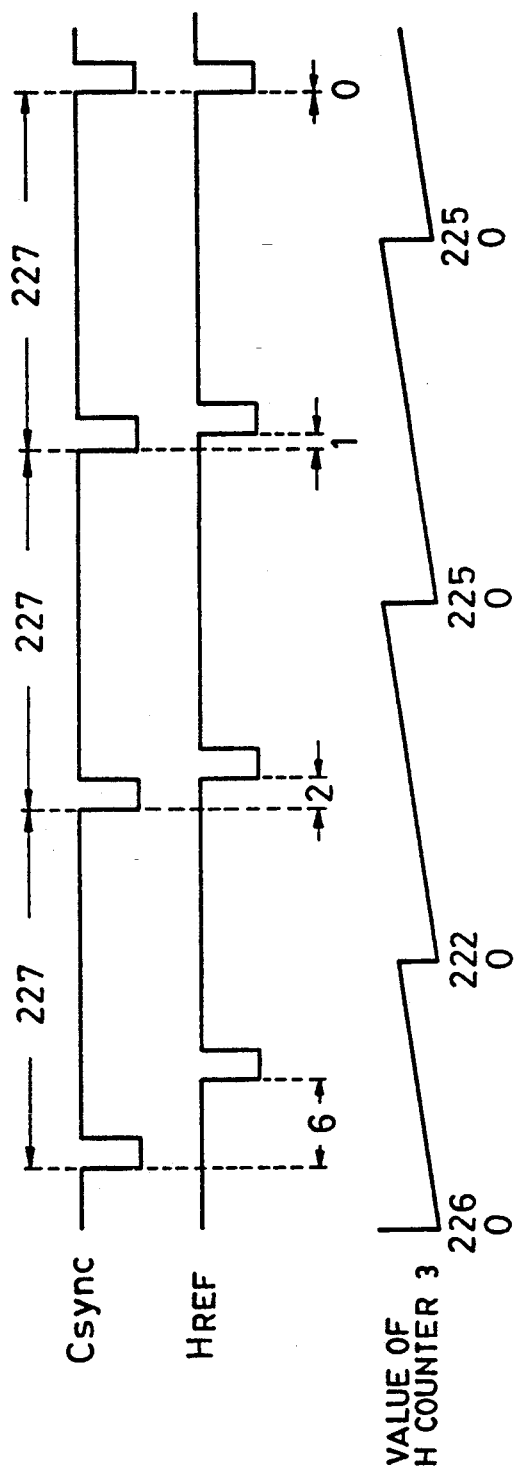
FIGS. 5 and 6 are timing charts showing waveforms from respective units of the synchronizing signal generator shown in FIG. 4.

The H counter 3 counts the number of clock pulses input from the clock-pulse input terminal $CK_H$, and supplies a H decoder 4 with the data of the count value (see FIG. 5).

The H decoder 4 makes the level of each of output signals D0-D6 a high level or a low level in accordance with the data of the count value supplied from the H counter 3, and supplies a data selector 5 with the resultant signals.

The H decoder 4 shown in FIG. 4 is configured in the following manner. That is, when the data of the count value Supplied from the H counter 3 indicate "226−16=210", output signal D0 is made a high level. When the data of the count value indicate "226−4=222", output signal D1 is made high level. When the data of the count value indicate "226−1=225", output signal D2 is made a high level. When the data of the count value indicate "226+16=242", output signal D3 is made a high level. When the data of the count value indicate "226+4=230", output signal D4 is made a high level. When the data of the count value indicate "226", output signal D5 is made a high level. When the data of the count value indicate "113", output signal D5 is made a high level. When the data of the count value indicate "50", output signal $H_{REF}$ (see FIG. 5) is made a high level. The data selector 5 outputs either one of the signals D0-D6 supplied from the H decoder 4 in accordance with select signals S0-S2 output from a controller 8 (to be described later), and supplies reset terminal $R_H$ of the H counter 3 with the signal to reset the H counter 3. The signal is also supplied to input terminal $C_{KV}$ of a vertical synchronizing counter (V counter) 11 (to be described later).

The output signal $H_{REF}$ from the H decoder 4 is supplied to the comparator 6 and a counter 7. The comparator 6 detects the phase difference between the signal $H_{REF}$ and the signal $C_{sync}$ supplied from the input terminal 1, and makes the level of each of its output signals C0-C3 a high level or a low level in accordance with the phase difference, and supplies the counter 7 and the controller 8 with the resultant signals.

That is, the comparator 6 makes the output signal C1 a high level when the phase of the signal $C_{sync}$ is advanced from the phase of the signal $H_{REF}$, and makes the signal C1 a low level when the phase of the signal $C_{sync}$ is delayed.

The comparator 6 is configured so as to make the level of each of the output signals C0, C2 and C3 a high level or a low level in accordance with the amount of the phase difference between the supplied signals $C_{sync}$ and $H_{REF}$. That is, when the phase difference between the signals $C_{sync}$ and $H_{REF}$ is equal to or more than 8 clocks when converted into the number of clock pulses output from the reference clock generator 2, the output signal C0 is made a high level. When the phase difference corresponds to 4-8 clocks, the output signal C2 is made a high level. When the phase difference corresponds to 0-4 clocks, the output signal C3 is made a high level. The levels of these output signals are held for one horizontal synchronizing period.

The output signal C0 from the comparator 6 and the signal $H_{REF}$ output from the decoder 4 are supplied to the counter 7. The counter 7 becomes in a reset state when the output signal C0 from the comparator 6 is a low level. When the signal C0 is a high level, the comparator 7 counts the number of pseudo horizontal synchronizing pulses in the signal $H_{REF}$ supplied from the H decoder 4, and supplies the controller 8 with a high-level output signal when the count value has reached "3".

As described above, the signal $C_{sync}$ (see FIG. 6) input from the input terminal 1 is also supplied to the vertical synchronizing signal detection circuit 9, which detects a vertical synchronizing blanking period (corresponding to "b" in FIG. 6) in the supplied vertical synchronizing signal.

Figure 6:
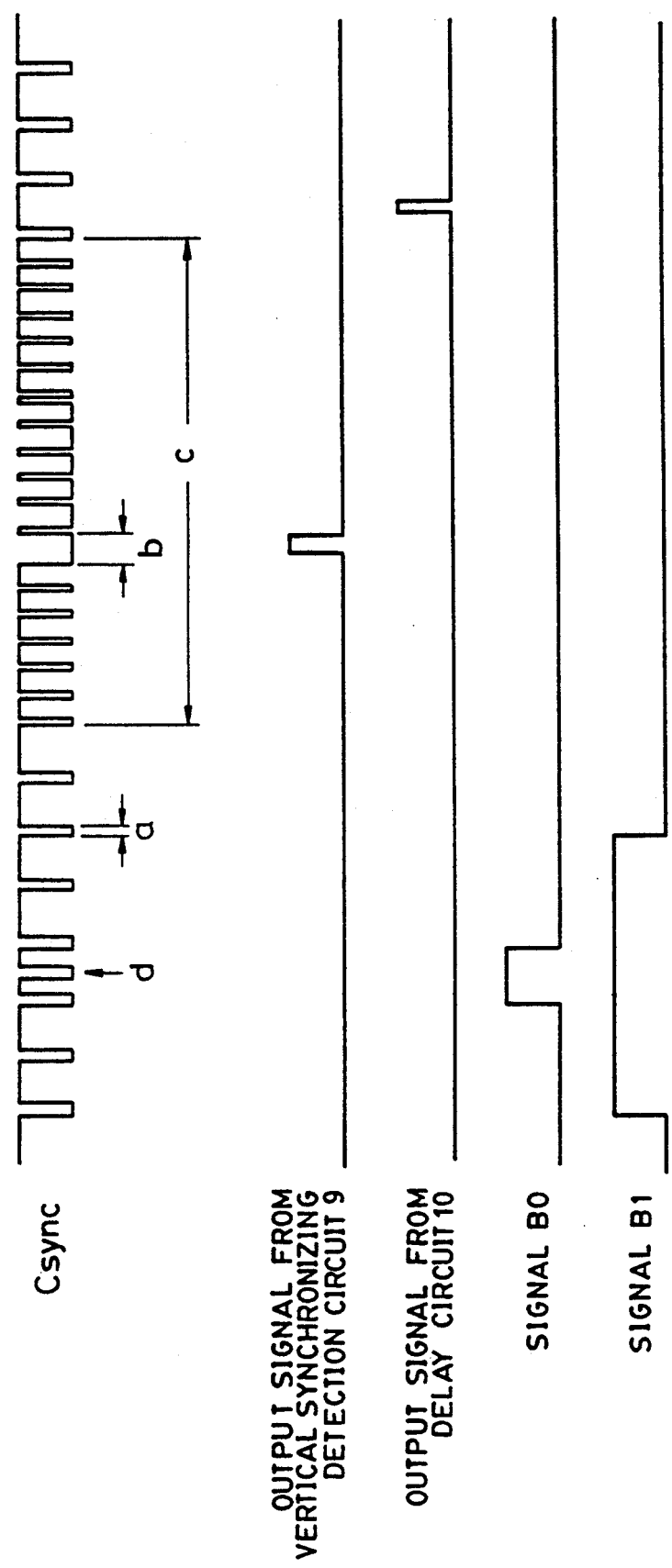

That is, as shown in FIG. 6, the vertical synchronizing blanking period ("b" in FIG. 6) stays a low level longer than the horizontal synchronizing blanking period ("a" in FIG. 6). Hence, the vertical synchronizing signal detection circuit 9 counts a period during which the level of the supplied signal $C_{sync}$ is low, makes the output signal a high level when the count value has indicated a period longer than the horizontal synchronizing blanking period ("a" in FIG. 6), and supplies the signal to a delay circuit 10 in the following stage.

The delay circuit 10 delays the output signal from the vertical synchronizing signal detection circuit 9 by a few Hs (H is a horizontal synchronizing period). The delayed signal is supplied to reset terminal Rv of the vertical synchronizing counter (V counter) 11, which is reset while the signal supplied from the delay circuit 10 is a high level.

Equalizing pulses are added to the signal $C_{sync}$ input from the input terminal 1. During the period of the equalizing pulses ("c" in FIG. 6) in the signal $C_{sync}$, timing signals different from those during the other period are formed according to the data of the count values by the H counter 3 and the V counter 11 by the H decoder 4 and the V decoder 12. Hence, if the vertical synchronizing signal detection circuit 9 has detected the vertical blanking period and the V counter 11 were reset during the period of the equalizing pulses as described above, there would be the possibility that the continuity of the timing signals formed during the equalizing pulses would be destroyed. Accordingly, in the present embodiment, the apparatus is configured so that the V counter 11 is reset at a timing sufficiently delayed from the period of the equalizing pulses in the signal $C_{sync}$ by delaying the output signal from the vertical synchronizing signal detection circuit 9 by a few H by the delay circuit 10, as described above.

As described above, the output signal from the data selector 5 is supplied to the clock-pulse input terminal $CK_v$ of the V counter 11. The V counter 11 counts the number of supply of high-level signals output from the data selector 5, and outputs the data of the count value to the V decoder 12.

When the data of the count value supplied from the V counter 11 has reached the number of horizontal synchronizing pulses during the period of one field (that is, 263), the V decoder 12 outputs a pseudo vertical synchronizing signal $V_{REF}$. When the data of the count value supplied from the V counter 11 have reached a predetermined count value, the V decoder makes the output signal B0 a high level, and supplies the signal to the controller 8.

The still video recording and reproducing apparatus in the present embodiment is configured so that a magnetic disk is rotated by a motor and a still-picture image signal for a period of one field is recorded on one of the recording tracks concentrically formed on the magnetic disk.

The motor is controlled by a motor servo circuit or the like so as to be rotated at a predetermined rotation speed. However, since it is impossible to perfectly remove uneven rotation and the like, the position to start recording a still-picture image signal and the position to stop the recording on the magnetic disk do not exactly coincide with each other, and there is the possibility that unrecorded portions or overlapped recorded portions are produced.

In the above-described case, as shown by "d" in FIG. 6, the period of the horizontal synchronizing signal is not 1 H at a position corresponding to the switching point between the position to start recording the still-picture image signal and the position to stop the recording in the signal $C_{sync}$ separated from the still-picture image signal reproduced from the magnetic disk, and so the phase difference between the signals $C_{sync}$ and $H_{REF}$ at this portion becomes large.

Accordingly, the V decoder 12 in the present embodiment makes its output signal B1 a high level when the data of the count value supplied from the V counter 11 has reached a count value corresponding to a point near the above-described switching point (a period of a few Hs) in the signal $C_{sync}$, and supplies the controller 8 with the signal.

The operation of inputting and outputting signals by the controller 8 in the FIG. 4 embodiment will now be explained by reference to the operation flowchart shown in FIG. 7.

In FIG. 4, the signal $C_{sync}$ input from the input terminal 1 and the signal $H_{REF}$ output from the H decoder 4 are supplied to the comparator 6, where the phase difference between the two signals is detected. The comparator 6 supplies the counter 7 and the controller 8 with one of the signals C0–C3 corresponding to the detected phase difference (see step $ST_1$ in FIG. 7).

The V counter 11 counts output signals from the data selector 5 and outputs the data of the count value to the V decoder 12, which makes its output signals B0 and B1 high levels when the data of the count value supplied from the V counter 11 has reached a predetermined count value. When the V counter 11 has counted "262", the signal B0 output from the V decoder 12 becomes a high level, and the controller 8 outputs select signals S0:1, S1:1 and S2:1 to the data selector 5, which selectively outputs the signal D6 output from the H decoder 4 when the H counter 3 has counted "113" to reset the H counter 3 and make the V counter 11 count up.

When, for example, the composite synchronizing signal to be handled conforms to the television signal of the NTSC system, the one-field period is "262.5 H". In the above-described operation, since the H counter 3 is reset at a period half (that is, a period for 113 clocks) the normal 1-H period (a period for 226 clocks when converted into the number of clock pulses output from the reference clock generator 2), the signal $H_{REF}$ output from the H decoder 4 can synchronize with the signal $C_{sync}$ even at a portion where a period for one field ends.

When the V counter 11 has counted a count value corresponding to near the switching point in the signal $C_{sync}$, the signal B1 output from the V decoder 12 becomes a high level. The controller 8 then alternately outputs select signals S0:1, S1:1 and S2:0, and S0:1, S1:0 and S2:1 to the data selector 5 at every 1-H period irrespective of the signals C0–C3 corresponding to the phase difference between the signals $C_{sync}$ and $H_{REF}$ output from the comparator 6. When the H counter 3 has counted "225" or "226", the data selector 5 alternately and selectively outputs the signals D2 and D5 output from the H decoder 4 at every 1-H period to reset the H counter 3 and make the V counter 11 count up (see steps $ST_5$–$ST_7$ in FIG. 7).

By the above-described operation, the signal $H_{REF}$ output from the H decoder 4 can synchronize with the signal $C_{sync}$ at a position corresponding to the switching point on the magnetic disk.

When both the signals B0 and B1 output from the V decoder 12 are low levels, the controller 8 outputs select signals S0–S2 corresponding to the signals C0–C3 output from the comparator 6 in accordance with the direction (that is, advanced or delayed) of the phase difference between the signals $C_{sync}$ and $H_{REF}$ and the amount of the phase difference.

When the comparator 6 has detected that the amount of the phase difference between the signals $C_{sync}$ and $H_{REF}$ corresponds to 0–4 clocks when converted into the number of clock pulses output from the reference clock generator 2, the signals C0 and C2 become low levels, and the signal C3 becomes a high level. When the phase of the signal $C_{sync}$ advances from the phase of the signal $H_{REF}$, the signal C1 becomes a high level. The controller 8 then outputs select signals S0:0, S1:1 and S2:0 to the data selector 5, which selectively outputs the signal D2 output from the H decoder 4 when the H counter 3 has counted "225". When the phase of the signal $C_{sync}$ is delayed from the phase of the signal $H_{REF}$, the signal C1 becomes a low level. The controller 8 then outputs select signals S0:1, S1:0 and S2:1 to the data selector 5, which selectively outputs the signal D5 output from the H decoder 4 when the H counter 3 has counted "226" to reset the H counter 3 and make the V counter 11 count up (see steps $ST_8$-$ST_{14}$ in FIG. 7).

By the above-described operation, the H counter 3 is reset at a timing shorter for a period of one clock than the normal reset period (a period for 226 clocks when converted into the number of clock pulses output from the reference clock generator 2) by the signal D2 or D5 output from the data selector 5. Hence, it becomes possible to make the signal $H_{REF}$ output from the H decoder 4 close in phase and synchronized with the signal $C_{sync}$.

When the comparator 6 has detected that the amount of the phase difference between the signals $C_{sync}$ and $H_{REF}$ corresponds to 4-8 clocks when converted into the number of clock pulses output from the reference clock generator 2, the signal C0 becomes a low level and the signal C2 becomes a high level. When the phase of the signal $C_{sync}$ advances from the phase of the signal $H_{REF}$, the signal C1 becomes a high level. The controller 8 then outputs select signals S0:1, S1:0 and S2:0 to the data selector 5, which selectively outputs the signal D1 output from the H decoder 4 when the H counter 3 has counted "222". When the phase of the signal $C_{sync}$ delays from the phase of the signal $H_{REF}$, the signal C1 becomes a low level. The controller 8 then outputs select signals S0:0, S1:0 and S2:1 to the data selector 5, which selectively outputs the signal D4 output from the H decoder 4 when the H counter 3 has counted "230" to reset the H counter 3 and make the V counter 11 count up (see steps $ST_8$, $ST_9$, and $ST_{15}$-$ST_{19}$ in FIG. 7).

By the above-described operation, since the H counter 3 is reset at a timing shorter or longer for a period of 4 clocks than the normal reset period (a period for 226 clocks when converted into the number of clock pulses output from the reference clock generator 2) by the signal D1 or D4 output from the data selector 5, it becomes possible to make the signal $H_{REF}$ output from the H decoder 4 close to in phase and synchronize with the phase of the signal $C_{sync}$.

When the comparator 6 has detected that the amount of the phase difference between the signals $C_{sync}$ and $H_{REF}$ is equal to or more than 8 clocks when converted into the number of clock pulses output from the reference clock generator 2, the signal C0 becomes a high level. The counter 7 is then reset when the signal C0 supplied from the comparator 6 is a low level, and is operated in an operation state when the signal C0 is a high level. In the operation state, the counter 7 counts the number of pulses of the signal $H_{REF}$ output from the H decoder 4, and outputs to the controller 8 a low-level signal until the count value has reached "3", and a high-level signal when the count value has reached "3".

In the present embodiment, when the comparator 6 has detected that the amount of the phase difference between the signals $C_{sync}$ and $H_{REF}$ corresponds to not less than 8 clocks when converted into the number of clock pulses output from the reference clock generator 2, it is assumed that noise has been added to the signal $C_{sync}$ or a dropout has occurred, and the counter 7 watches whether or not such abnormal states continuously occur for a period of 3 Hs.

While the period during which the abnormal states continue does not reach a period of 3 Hs in the counter 7 detecting the period as described above (that is, while the signal supplied from the counter 7 to the controller 8 is a low level), the controller 8 outputs select signals S0:1, S1:0 and S2:1 to the data selector 5 irrespective of the direction of the phase difference between the signals $C_{sync}$ and $H_{REF}$. The data selector 5 selectively outputs the output signal D5 output from the H decoder 4 when the H counter 3 has counted "226" to reset the counter 3 and make the V counter 11 count up.

The above-described operation is repeated until the count value by the counter 7 reaches "3" or until the amount of the phase difference between the signals $C_{sync}$ and $H_{REF}$ becomes less than 8 clocks in the comparator 6 and the output signal C0 becomes a low level.

When the period during which the abnormal states continue has reached a period of 3 H in the counter 7 (that is, when the signal supplied from the counter 7 to the controller 8 has become a high level), if the phase of the signal $C_{sync}$ advances from the phase of the signal $H_{REF}$, the signal C1 becomes a high level. The controller 8 then outputs select signals S0:0, S1:0 and S2:0 to the data selector 5, which selectively outputs the signal D0 output from the H decoder 4 when the H counter 3 has counted "210". If the phase of the signal $C_{sync}$ is delayed from the phase of the signal $H_{REF}$, the signal C1 becomes a low level. The controller 8 then outputs select signals S0:1, S1:1 and S2:0 to the data selector 5, which selectively outputs the signal D3 output from the H decoder 4 when the H counter 3 has counted "242" to reset the H counter 3 and make the V counter 11 count up (see steps $ST_8$ and $ST_{20}$-$ST_{27}$ in FIG. 7).

By the above-described operation, the N counter 3 is reset at the normal reset period (a period corresponding to 226 clocks when converted into the number of clock pulses output from the reference clock generator 2) by the signal D5 output from the data selector 5 even if the signal $C_{sync}$ is in an abnormal state. Hence, the H counter 3 is in a free-running state. When the abnormal state has continued for a period of 3 H, the H counter 3 is reset at a timing shorter or longer for a period of 16 clocks than the normal reset period (a period corresponding to 226 clocks when converted into the number of clock pulses output from the reference clock generator 2) by one of the signals D0–D3 output from the data selector 5. Hence, it becomes possible to make the signal $H_{REF}$ output from the H decoder 4 close to in phase and synchronized with the signal $C_{sync}$.

Figure 7:
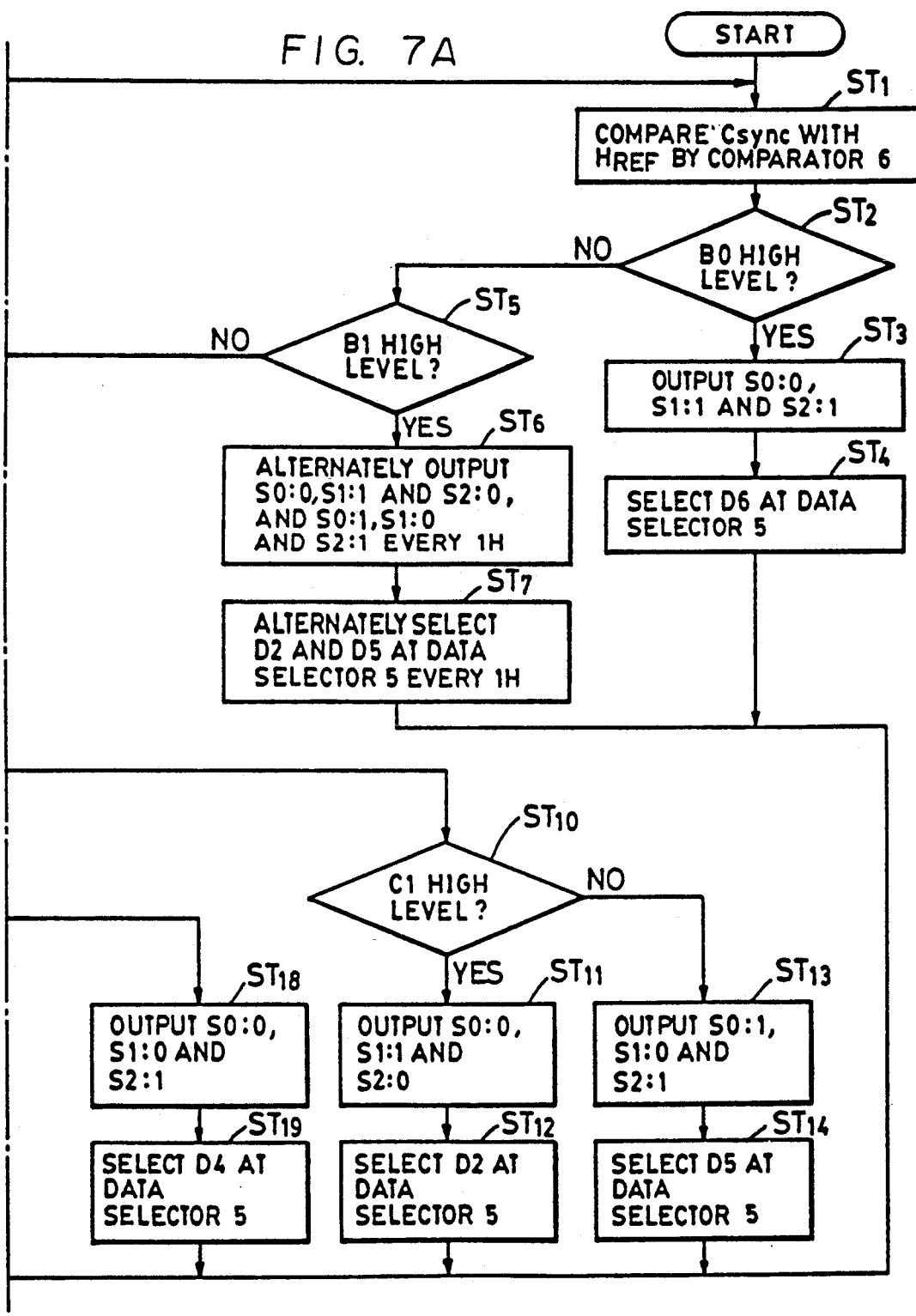
FIG. 7, composed of FIGS. 7A and 7B, is an operation flowchart for explaining the operation of the synchronizing signal generator shown in FIG. 4.
Figure 7B:
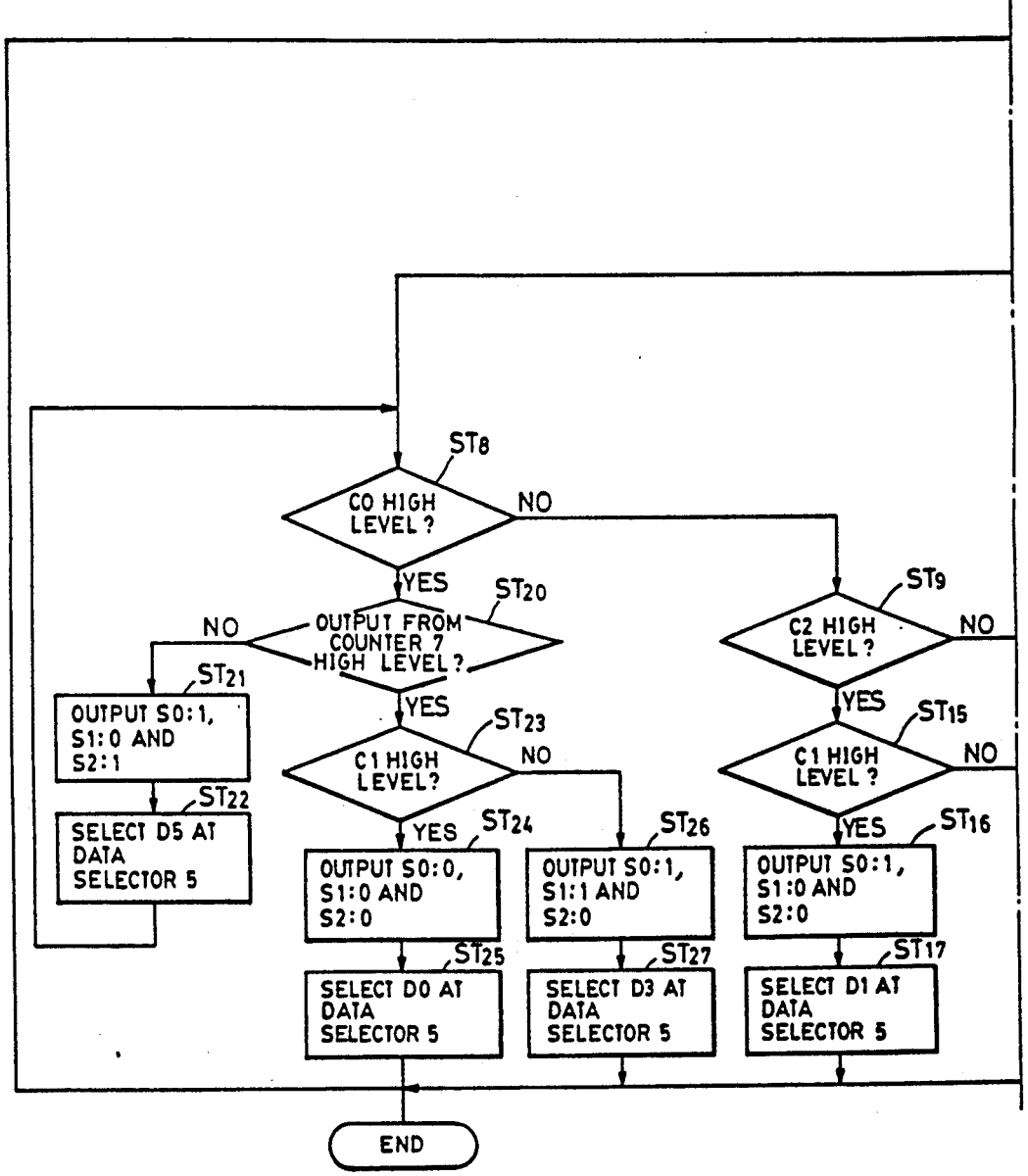

After the data selector 5 has output one of the signals D0–D6 output from the H decoder 4, each of the above-described operations returns again to step $ST_1$ in FIG. 7, where the phases of the signals $C_{sync}$ and $H_{REF}$ are compared with each other by the comparator 6, and the above-described operations are further repeated.

The signal $H_{REF}$ generated from the H decoder 4 as described above is supplied to a mono multivibrator 13, and the signal $V_{REF}$ generated from the V decoder 12 is supplied to a mono multivibrator 14. The mono multivibrators 13 and 14 trigger pulses in the supplied signals $H_{REF}$ and $V_{REF}$, and generate horizontal blanking pulses $H_{BLK}$ and vertical blanking pulses $V_{BLK}$ each having a predetermined pulse width, respectively.

These two kinds of pulses are used for processings to provide horizontal and vertical blanking periods in the still-picture image signal reproduced from the magnetic disk in the still video recording and reproducing apparatus, respectively.

Although, in the present embodiment, an explanation has been provided of the synchronizing signal generator in the still video recording and reproducing apparatus for handling a still-picture image signal conforming to a television signal of the NTSC system, the present invention is not limited thereto. An apparatus conforming to a television signal of the PAL or SECAM system may be realized by an identical configuration. In this case, in order to coincide with the corresponding system, the length of one horizontal synchronizing period and the length of one vertical synchronizing period, that is, timings to reset the H counter 3 and the V counter 11, may be changed.

Furthermore, although, in the present embodiment, an explanation has been provided of the case in which the synchronizing signal generator generates horizontal and vertical blanking pulses synchronizing with the composite synchronizing signal $C_{sync}$ contained in the reproduced still-picture image signal, the present invention is not limited thereto, but may also be applied to cases in which various other kinds of timing signals, such as clamping pulses and the like, are formed. In these cases, the decoded values by the H decoder 4 and the V decoder 12 for decoding the data of the count values output from the H counter 3 and the V counter 11, respectively, may be set so as to become desired timings. Particularly, a composite synchronizing signal may be newly provided from the horizontal synchronizing signal and the vertical synchronizing signal formed by decoding the data of the count values output from the H counter 3 and the V counter 11 in place of the composite synchronizing signal $C_{sync}$ separated from the still-picture image signal reproduced from the magnetic disk.

Moreover, although, in the present embodiment, the signals output from the comparator 6 in accordance with the signals $C_{sync}$ and $H_{REF}$ are represented by the three-staged signals C0, C2 and C3, the signals are not limited thereto, but the number of stages may be increased or reduced.

In the present embodiment, the apparatus is configured so that the period staying at a low level in the signal $C_{sync}$ contained in the still-picture image signal reproduced from the magnetic disk, that is, the vertical blanking period ("b" in FIG. 6), is detected, and the V counter 11 is reset when a low level has been detected for a predetermined period or more. In this case, it is necessary to prevent the situation in which a dropout occurs in the signal $C_{sync}$ contained in the still-picture image signal reproduced from the magnetic disk, and this portion is erroneously detected to reset the V counter 11.

A magnetic medium named a PG pin is provided on a circumference on the core of the magnetic disk used in the still video recording and reproducing apparatus of the present embodiment. In the still video recording and reproducing apparatus, the magnetic disk is rotated when a still-picture image signal is recorded on the magnetic disk. The rotation phase of the magnetic disk is detected by detecting the position of the PG pin on the rotating magnetic disk, and recording of the still-picture image signal on the magnetic disk is started or stopped according to the detected position of the PG pin.

Accordingly, by generating window pulses or the like when the PG pin on the magnetic disk has detected that the V counter 11 was reset as described above, detecting the period of a low level only during a period defined by the window pulses, and not detecting the period of a low level during the other period, it becomes possible to prevent the V counter 11 from being erroneously set.

As described above, since the synchronizing signal generator of the present embodiment is configured so that the phase of the signal $C_{sync}$ separated from the still-picture image signal reproduced from the magnetic disk is compared with the phase of the synchronizing signal formed by the counter or the like according to the reference clock signal generated from the reference clock generator, the reset timing of the counter is changed in accordance with the phase difference, and the period of the synchronizing signal output from the counter is changed, it becomes possible to generate a desired reproducing timing signal. It is thereby possible to obtain a reproducing timing signal which follows a change in the signal $C_{sync}$ contained in the still-picture image signal reproduced from the magnetic disk.

Furthermore, since the inventive synchronizing signal generator is also configured so that the phase of the reproducing timing signal is not instantaneously corrected even if the signal $C_{sync}$ has changed, but is corrected step by step by a predetermined amount, it becomes possible to obtain a stable reproducing timing signal without being disturbed by external disturbance, such as noise and the like.

Moreover, since the circuit configuration is digitized as shown in the present embodiment, adjustment and the like become unnecessary, and a stable performance can be obtained against changes in environment, such as temperature, humidity and the like. In addition, since the the circuit scale is small, the circuitry can easily be made by ICs (integrated circuits), and so it becomes possible to reduce the mounted area in the apparatus, the number of components, and the like.

As explained above, according to the present embodiment, it becomes possible to provide a synchronizing signal generator capable of forming various kinds of correct timing signals even if a synchronizing signal reproduced from a recording medium is deteriorated.

A second embodiment of the present invention will now be explained.

Figure 8:
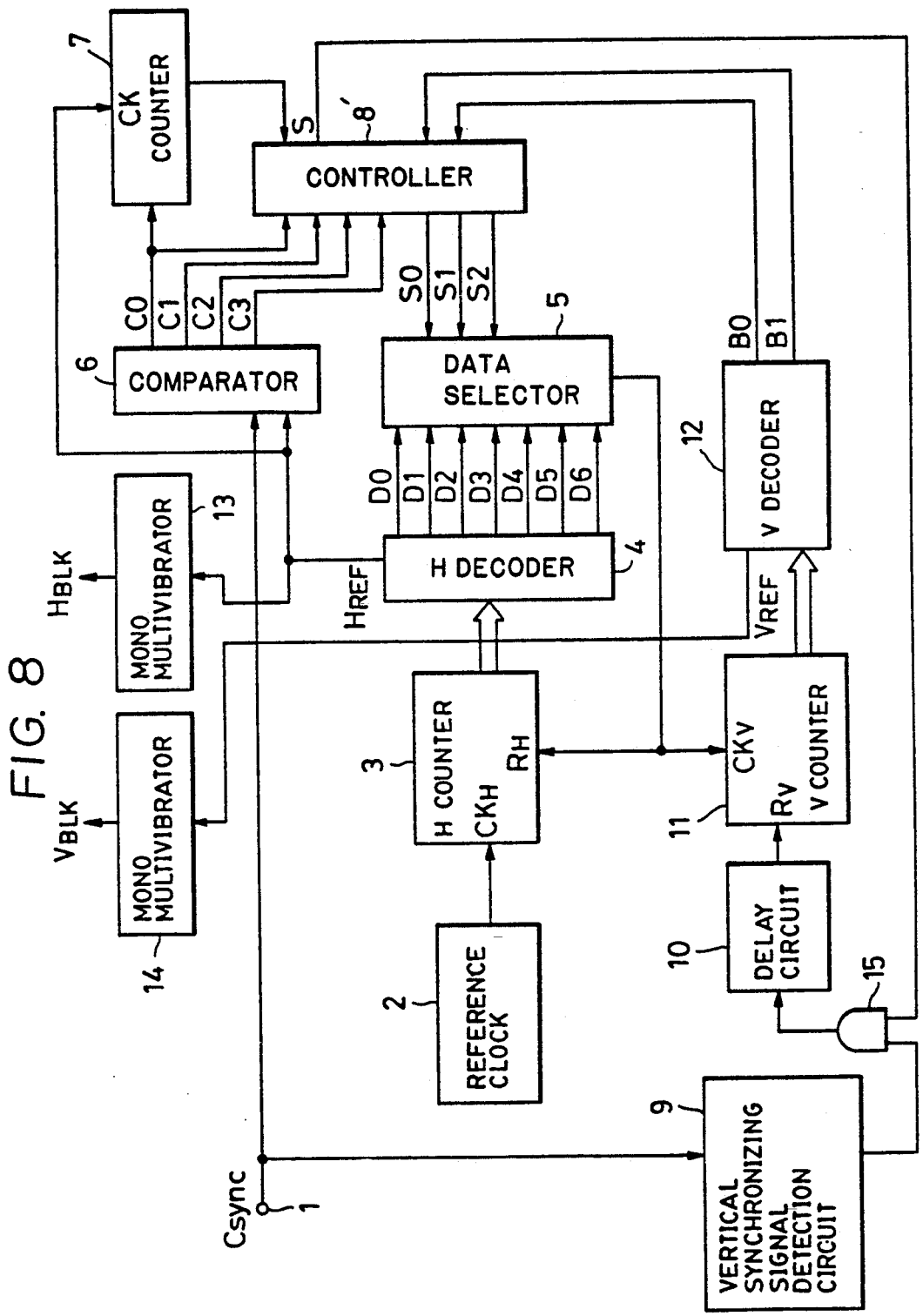
FIG. 8 is a diagram showing the schematic configuration of a synchronizing signal generator, representing a second embodiment of the present invention, in a still video recording and reproducing apparatus for handling still-picture image signals conforming to television signals of the NTSC system.

FIG. 8 is a diagram showing the schematic configuration of a synchronizing signal generator in a still video recording and reproducing apparatus for handling a still-picture image signal conforming to a television signal of the NTSC system. In the synchronizing signal generator shown in FIG. 8, like configurations as those in the synchronizing signal generator shown in FIG. 4 are indicated by like numerals, and a detailed explanation thereof will be omitted. Only configurations different from those in the synchronizing signal generator shown in FIG. 4 will now be explained.

In the synchronizing signal generator shown in FIG. 8, as in the previous embodiment, the signal $C_{sync}$ (see FIG. 6) input from the input terminal 1 is also supplied to the vertical synchronizing signal detection circuit 9, which detects the vertical synchronizing blanking period ("b" in FIG. 6) in the supplied vertical synchronizing signal.

That is, as shown in FIG. 6, the vertical synchronizing blanking period ("b" in FIG. 6) stays a low level longer than the horizontal synchronizing blanking period ("a" in FIG. 6). Hence, the vertical synchronizing signal detection circuit 9 counts a period during which the level of the supplied signal $C_{sync}$ is low, makes the output signal a high level when the count value has indicated a period longer than the horizontal synchronizing blanking period ("a" in FIG. 6), and supplies the signal to the delay circuit 10 via an AND gate in the following stage.

The AND gate 15 supplies the delay circuit 10 with the signal output from the vertical synchronizing signal detection circuit 9 only when a forced-free-running-mode instruction signal S output from a controller 8' (to be described later) is a high level.

The delay circuit 10 delays the output signal from the vertical synchronizing signal detection circuit 9 by a few H (H is a horizontal synchronizing period). The delayed signal is supplied to reset terminal Rv of the vertical synchronizing counter (V counter) 11, which is reset while the signal supplied from the delay circuit 10 is a high level. In the present embodiment, however, by providing the AND gate 15, the forced-free-running-mode is provided when the rotation is unstable or during feeding of the tracks, and so the V counter 11 is not reset.

The controller 8' shown in FIG. 8 cannot obtain a stable signal $C_{sync}$ from the reproduced still-picture image signal when starting to rotate a magnetic disk (not shown) or during track feeding of a magnetic head (not shown). Hence, by outputting a low-level forced-free-running-mode instruction signal S, the AND gate 15 is closed so that the signal output from the vertical synchronizing signal detection circuit 9 is not supplied to the delay circuit 10.

Thus, it never happens that the V counter 11 is reset when a stable signal $C_{sync}$ cannot be obtained. When the counter 11 has counted the number of horizontal synchronizing pulses within a period of one field (that is, 263), it automatically returns to "0", and is again in a free-running state to start counting.

When the rotation of the magnetic disk has entered a stationary state, or when track feeding of the magnetic head has been completed, the controller 8' opens the AND gate 15 by outputting a high-level forced-free-running-mode instruction signal S, and supplies the delay circuit 10 with the signal output from the vertical synchronizing signal detection circuit 9.

As described above, it becomes possible to prevent erroneous operation of the V counter 11 by forcibly making the V counter 11 in a free-running state when a stable signal $C_{sync}$ cannot be obtained from the still-picture image signal reproduced from the magnetic disk.

In the FIG. 8 embodiment, since the operation of inputting and outputting signals by the controller 8' after the rotation of the magnetic disk has reached a stationary state is the same as the operation according to the operation flowchart shown in FIG. 7, a detailed explanation thereof will be omitted.

As described above, in the present embodiment, when a stable signal $C_{sync}$ cannot be obtained from the still-picture image signal reproduced from the magnetic disk, erroneous operation of the V counter is prevented by forcibly placing the V counter in a free-running state. Hence, it becomes possible to provide various kinds of correct timing signals even if a stable synchronizing signal is not reproduced from a recording medium, or the reproduced synchronizing signal is deteriorated.

A third embodiment of the present invention will now be explained.

Figure 9:
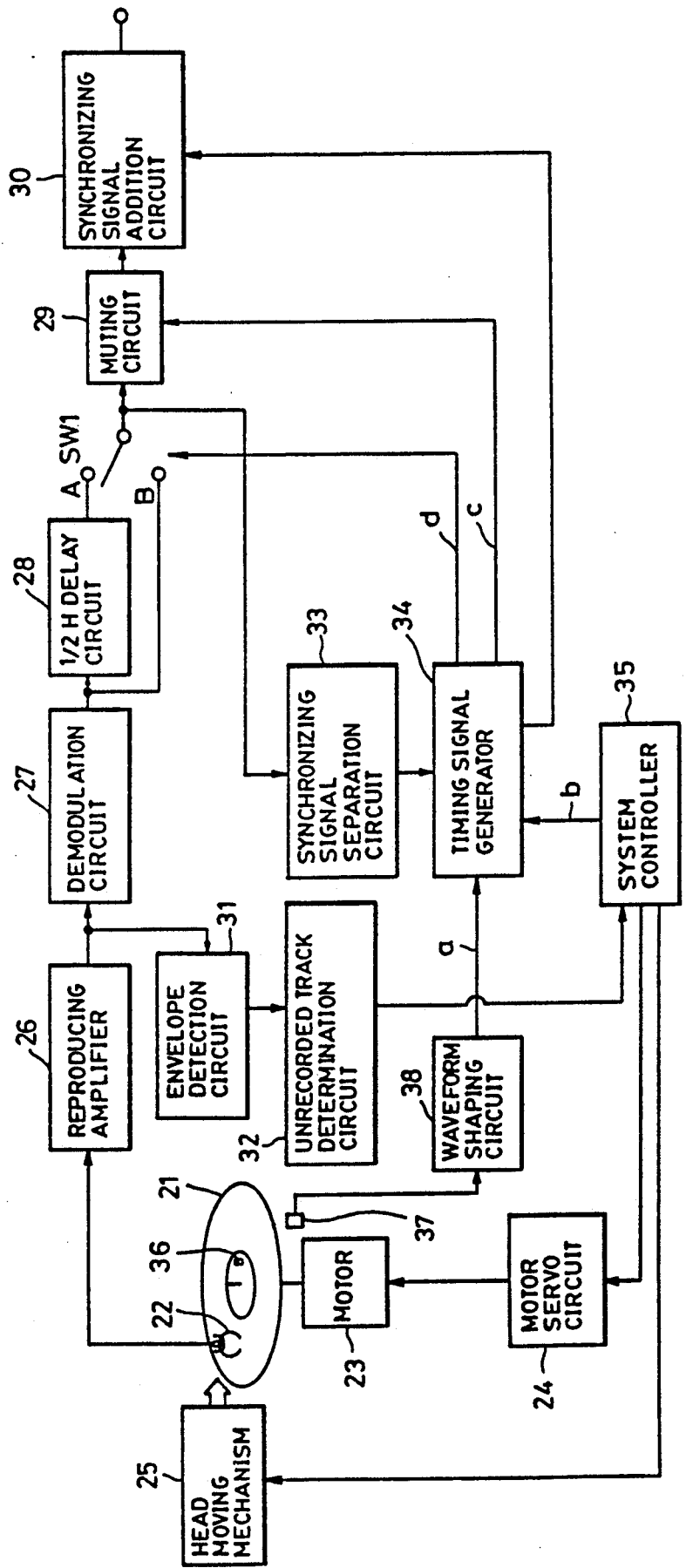
FIG. 9 is a diagram showing the schematic configuration of a still video reproducing apparatus, representing a third embodiment of the present invention, for repeatedly reproducing an image signal from a magnetic disk on which the image signal conforming to a television signal of the NTSC system has been recorded.

FIG. 9 shows the schematic configuration of a still video reproducing apparatus, representing a third embodiment of the present invention, for repeatedly reproducing an image signal from a magnetic disk on which the image signal conforming to a television signal of the NTSC system is recorded.

In FIG. 9, 50 recording tracks are concentrically formed on a magnetic disk 21, and an image signal for one field is recorded on each of the recording tracks. A magnetic head 22 reproduces the image signal recorded on each recording track. A motor 23 rotates the magnetic disk 21 at a speed of 3600 rpm. A motor servo circuit 24 rotates the motor 23 at the constant speed of 3600 rpm. A head moving mechanism 25 moves the magnetic head 22 among the recording tracks formed on the magnetic disk 21. A reproducing amplifier 26 amplifies the signal reproduced from the magnetic disk 21 by the magnetic head 22 and outputs the amplified signal. A demodulation circuit 27 demodulates the reproduced signal amplified by the reproducing amplifier 26 to restore the image signal. A ½ delay circuit 28 delays the image signal demodulated by the demodulation circuit 27 by ½ H. A switch SW1 for skew compensation alternately selects and outputs the image signal output from the demodulation circuit 27 and the image signal delayed by ½ H by the ½ H delay circuit 28 at every one-field period. A muting circuit 29, which is controlled by a timing signal generator 34 (to be described later), performs muting of the image signal output from the SW1. A synchronizing signal addition circuit 30 replaces a composite synchronizing signal added to the input image signal with a composite synchronizing signal output from the timing signal generator 34 (to be descried later) when an image signal is input from the muting circuit 29, and outputs only the composite synchronizing signal output from the timing signal generator 34 when an image signal is not input from the muting circuit 29. An envelope detection circuit 31 performs envelope detection of the reproduced signal amplified by and output from the reproducing amplifier 26, and outputs a detection signal. An unrecorded track determination circuit 32 determines whether the track on the magnetic disk 21 traced by the magnetic head 22 is an unrecorded track or a recorded track by comparing the level of the detection signal output from the envelope detection circuit 31 with a preset reference level, and outputs a determination signal corresponding to the result of determination to a system controller 35 (to be described later). A synchronizing signal separation circuit 33 separates the composite synchronizing signal from the signal output from the SW1, and outputs it. A timing signal generator 34 generates various kinds of timing signals corresponding to the composite synchronizing signal separated from the synchronizing signal separation circuit 33 and a PG signal supplied from a waveform shaping circuit 38 (to be described later) in accordance with commands from the system controller 35. The system controller 35 inputs the determination signal output from the unrecorded track determination circuit 32, and controls the operations of the motor servo circuit 24, the head moving mechanism 25 and the timing signal generator 34. A magnetic piece (PG pin) 36 is provided on a circumference on the core of the magnetic disk 21. A PG coil 37 generates a pulse every time the PG pin 36 crosses in order to detect the rotation phase of the magnetic disk 21. The waveform shaping circuit 38 shapes the waveform of a pulse signal output from the PG coil 37, and outputs the shaped signal as a PG signal corresponding to the rotation phase of the magnetic disk 21.

The operation of the apparatus of the present embodiment shown in FIG. 9 will now be explained.

In FIG. 9, when a power-supply switch (not shown) is first switched on to supply power from a power-supply unit (not shown), the system controller 35 provides a command (to make a signal output from signal line "b" a high level) to the timing signal generator 34, which operates the muting circuit 29, which performs muting of the signal output from the SW1. At this time, the timing signal generator 34 is in a free-running state. A generated composite synchronizing signal is supplied to the synchronizing signal addition circuit 30, and only the composite synchronizing signal is output from output terminal in a predetermined level.

The system controller 35 gives a command to the motor servo circuit 24, which drives the motor 23 to rotate the magnetic disk 21 at the speed of 3600 rpm.

The reproduced signal output from the magnetic head 22 is amplified by the reproducing amplifier 26, and is supplied to the envelope detection circuit 31. The envelope detection circuit 31 performs envelope detection of the reproduced signal amplified by and supplied from the reproducing amplifier 26. By comparing the level of the detection signal with the previously-set reference level, the unrecorded track determination circuit 32 determines that the track on the magnetic disk 21 traced by the magnetic head 22 is a recorded track if the level of the detection signal is larger than the reference level, and that the track on the magnetic disk 21 traced by the magnetic head 22 is an unrecorded track if the level of the detection signal is smaller than the reference level, and supplies the system controller 35 with a determination signal corresponding to the result of determination.

After a time sufficient enough so that the magnetic disk 21 starts constant-speed rotation lapsed from the operation of the motor servo circuit 24, if the system controller 35 has detected from the determination signal supplied from the unrecorded track determination circuit 32 that the track on the magnetic disk 21 traced by the magnetic head 22 is a recorded track, it performs skew compensation by alternately switching the signal obtained by delaying the image signal demodulated by and output from the demodulation circuit 27 by ½ H by the ½ H delay circuit 28 and the undelayed signal at every one-field period by the SW1, and then outputs the resultant signal from the SW1. The switching timing by the SW1 at the skew compensation is switched with the rising timing of the PG-signal pulse formed by shaping the waveform of the pulse signal output from the PG coil 37 by the waveform shaping circuit 38 every time the PG pin 36 on the rotating magnetic disk 21 crosses the PG coil 37.

The position to start the vertical synchronizing signal in the image signal to be recorded on the magnetic disk 21 is defined to be after 7 H±2 H from the rising timing of the PG-signal pulse. Hence, it is also possible to form a signal having the same timing as the rising timing of the PG-signal pulse by supplying the timing signal generator 34 with the composite synchronizing signal separated from the reproduced image signal by the synchronizing signal separation circuit 33, and counting by the timing signal generator 34 the number of horizontal synchronizing pulses from the point to start the vertical synchronizing signal in the composite synchronizing signal supplied from the synchronizing signal separation circuit 33. Hence, switching of the SW1 in skew compensation may also be performed according to the timing signal thus formed.

When the determination signal supplied from the unrecorded track determination circuit 32 indicates that the track on the magnetic disk 21 traced by the magnetic head 22 is a recorded track, the system controller 35 releases the muting operation by the muting circuit 29. When the determination signal indicates an unrecorded track, the system controller 35 continues the muting operation.

The signal output from the muting circuit 29 is input to the synchronizing signal addition circuit 30, which adds the composite synchronizing signal generated at the timing signal generator 34 to the signal supplied from the muting circuit 29, and outputs the resultant signal. That is, when the muting circuit 29 operates, only the composite synchronizing signal generated from the timing signal generator 34 is output. When the muting circuit 29 is not operated, the composite synchronizing signal added to the image signal output from the muting circuit 29 and the composite synchronizing signal generated from the timing signal generator 34 are exchanged with each other and are output.

The operation of the timing signal generator 34 shown in FIG. 9 will now be explained.

Figure 10:
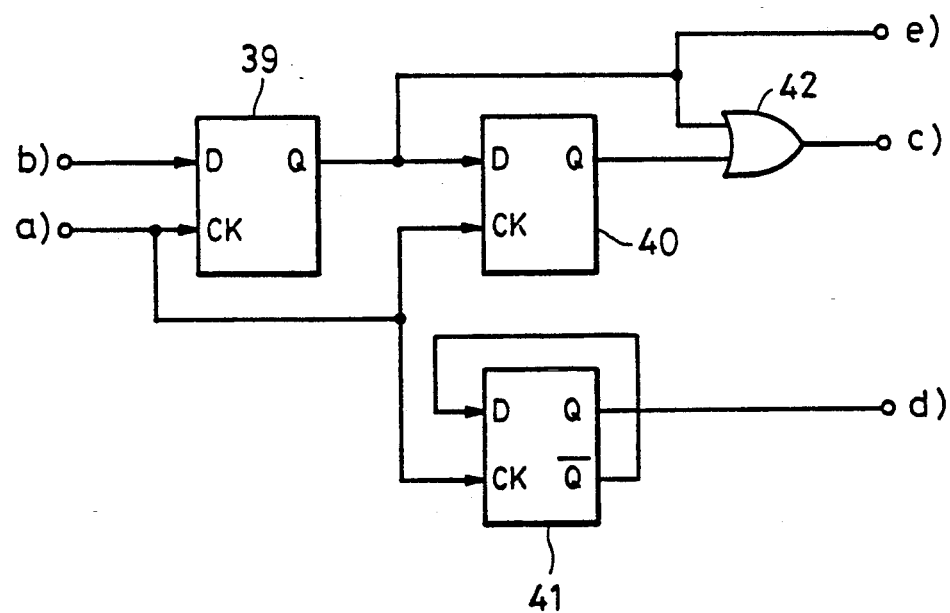
FIG. 10 is a circuit diagram showing a part of the configuration of the timing signal generator shown in FIG. 9.

FIG. 10 is a circuit diagram showing a part of the configuration of the timing signal generator 34 shown in FIG. 9. In FIG. 10, there are shown D flip-flops 39, 40 and 41, and an OR gate 42.

Figures 11A, 11B, 11C, 11D, 11E:
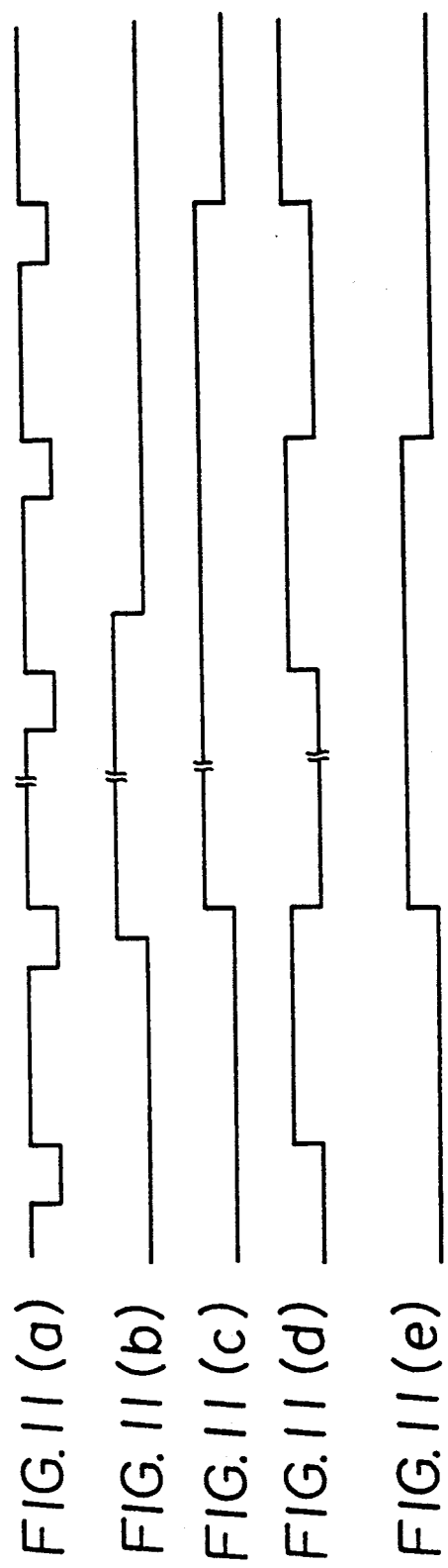
FIGS. 11(a)-11(e) are timing charts showing the waveforms of signals on signal lines indicated by "a'-'-"e" in FIGS. 9 and 10.

FIG. 11 is a timing chart showing the waveforms of signals on signal lines indicated by "a"–"e" in FIGS. 9 and 10.

In FIG. 11, chart a) shows the waveform of the PG signal output from the waveform shaping circuit 38 shown in FIG. 9. Rising portions in the waveform indicate timings with which the PG pin 36 provided on the magnetic disk 21 crosses the PG coil 37.

Chart b) shows the waveform of the signal supplied from the system controller 35 to the timing signal generator 34 in accordance with the result of determination indicated by the determination signal output from the unrecorded track determination circuit 32. When the track on the magnetic disk 21 traced by the magnetic head 22 is a recorded track, the signal becomes a low level. When the track is an unrecorded track, the signal becomes a high level. The D flip-flop 39 shown in FIG. 10 latches the above-described signal "b" with the rising timing of the signal "a", and outputs a signal shown in chart e) in FIG. 11. The signal "e" is latched by the D flip-flop 40 with the rising timing of the signal "a", and is supplied to the OR gate 42 to which the signal "e" is supplied. A signal shown in chart c) in FIG. 11 is output from the OR gate 42. That is, the signal "c" is obtained by latching the signal "b" with the rising timing of the signal "a". When the signal "b" is switched from a low level to a high level, the signal "c" is also switched from a low level to a high level with the first rising timing of the signal "a". When the signal "b" is switched from a low level to a high level, the signal "c" is switched from a high level to a low level with the second rising timing of the signal "a". The signal "c", which is supplied from the timing signal generator 34 to the muting circuit 29 shown in FIG. 9 to perform a muting operation, releases the muting operation when it is a low level.

The D flip-flop 41 shown in FIG. 10 outputs the signal "d" the polarity of which is reversed with the rising timing of the signal "a". The signal "d" controls the switching timing of the SW1 shown in FIG. 9. That is, the SW1 shown in FIG. 9 is connected to terminal A shown in FIG. 9 when the signal "d" is a high level, and is connected to terminal B when the signal "d" is a low level.

The operation to generate the composite synchronizing signal in the timing signal generator 34 shown in FIG. 9 will now be explained.

Figure 12:
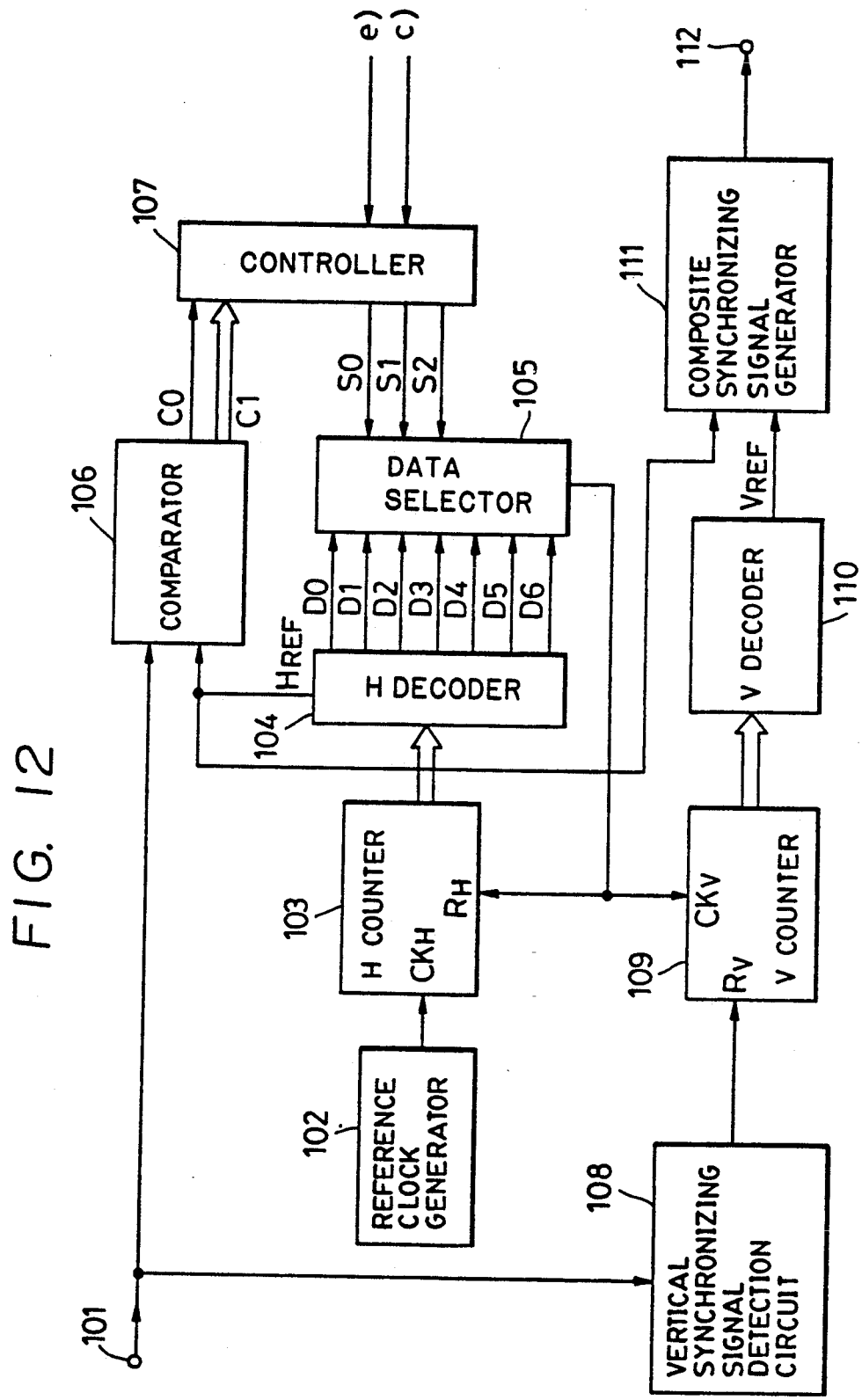
FIG. 12 is a diagram showing the configuration of a composite signal generating unit within the timing signal generator shown in FIG. 9.

FIG. 12 is a diagram showing the configuration of a composite signal generating unit within the timing signal generator 34 shown in FIG. 9.

The composite signal generating unit shown in FIG. 12 inputs the composite synchronizing signal separated from the image signal reproduced from the magnetic disk 21 shown in FIG. 9, and generates a new composite synchronizing signal the phase of which is synchronized with the phase of the input composite synchronizing signal. The unit is configured so as to be able to control follow-up speed for synchronizing the phases of the two signals by a command from the outside.

Figure 13:
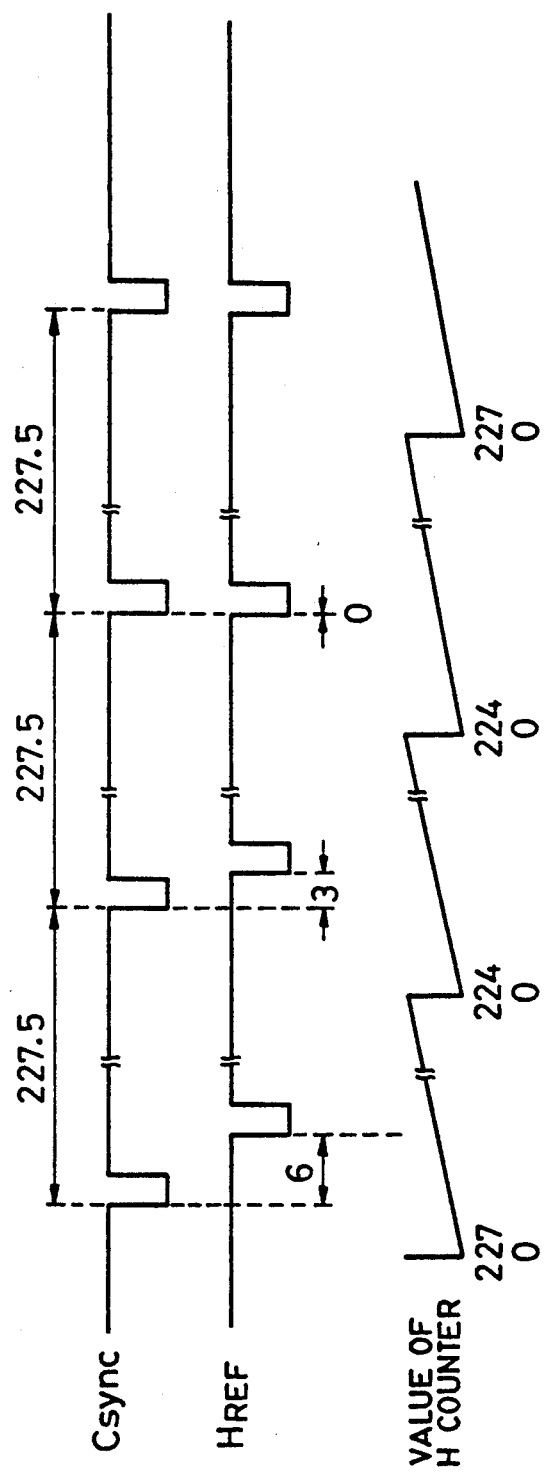
FIG. 13 is a timing chart for explaining the operation of the composite signal generating unit shown in FIG. 12.

In FIG. 12, the composite synchronizing signal $C_{sync}$ (see FIG. 13) separated from the image signal reproduced from the magnetic disk 21 shown in FIG. 9 by the synchronizing signal generator 33 and supplied from the synchronizing signal generator 33 is input to input terminal 101, and is supplied to a comparator 106 (to be described later) and a vertical synchronizing signal detection circuit 108.

Clock pulses having the color subcarrier frequency (3.57945 MHz) are generated from a reference clock generator 102, and are supplied to clock-pulse input terminal CKH of a horizontal synchronizing counter (H counter) 103.

The H counter 103 counts the number of clock pulses input from the clock-pulse input terminal $CK_H$, and supplies a H decoder 104 with the data of the count value (see FIG. 10).

The H decoder 104 makes the level of each of output signals D0–D6 a high level or a low level in accordance with the data of the count value supplied from the H counter 103, and supplies a data selector 5 with the resultant signals.

The H decoder 104 shown in FIG. 12 is configured in the following manner. That is, when the data of the count value Supplied from the H counter 103 indicate "227−3=224", output signal D0 is made a high level. When the data of the count value indicate "227−2=225", output signal D1 is made a high level. When the data of the count value indicate "227−1=226", output signal D2 is made a high level. When the data of the count value indicate "227", output signal D3 is made a high level. When the data of the count value indicate "227+1=228", output signal D4 is made a high level. When the data of the count value indicate "227+2=229", output signal D5 is made a high level. When the data of the count value indicate "227+3=230", output signal D6 is made a high level. When the data of the count value indicates "16", output signal $H_{REF}$ (see FIG. 13) is made a high level.

The data selector 105 outputs either one of the signals D0–D6 supplied from the H decoder 104 in accordance with select signals S0–S2 output from a controller 107 (to be described later), and supplies reset terminal RH of the H counter 103 with the signal to reset the H counter 103. The signal is also supplied to input terminal $CK_v$ of a vertical synchronizing counter (V counter) 109 (to be described later).

The output signal $H_{REF}$ from the H decoder 104 is supplied to the comparator 106 and a composite synchronizing signal generator 111 (to be described later). The comparator 106 detects the phase difference between the signal $H_{REF}$ and the signal $C_{sync}$ supplied from the input terminal 101, and outputs signal C0 or C1 to the controller 107 in accordance with the phase difference. That is, when the phase of the signal $C_{sync}$ advances from or coincides with the phase of the signal $H_{REF}$, the output signal C0 is made a high level. When the phase of the signal $C_{sync}$ is delayed from the phase of the signal $H_{REF}$, the output signal C0 is made a low level. Data corresponding to the amount of the phase difference between the signals $C_{sync}$ and $H_{REF}$ are output as the output signal C1. The comparator 106 detects the phase difference between the a horizontal synchronizing signal having a phase closest to the phase of the signal $H_{REF}$ in the signal $C_{sync}$ and the signal $H_{REF}$. The comparator 106 is configured so as to always detect the phase difference between the horizontal synchronizing signal in the signal $C_{sync}$ and the signal $H_{REF}$ without being influenced by the horizontal synchronizing pulses shown in FIG. 3 (B and C in FIG. 3) or equalizing pulses in the vertical synchronizing period.

As described above, the signal $C_{sync}$ input from the input terminal 101 is also supplied to the vertical synchronizing signal detection circuit 108. The vertical synchronizing signal detection circuit 108 is configured so as to detect and separate the vertical synchronizing signal in the supplied composite synchronizing signal, and supplies reset terminal $R_v$ with the separated signal to reset the V counter 109.

As described above, the output signal from the data selector is supplied to the clock-pulse input terminal $CK_v$ of the V counter 109, which counts the number of high-level signals output from the data selector 105 and outputs the data of the count value to the V decoder 110.

When the data of the count value supplied from the V counter 109 has reached the number of horizontal synchronizing pulses within a period of one field (that is, 263), the V decoder 110 outputs a pseudo vertical synchronizing signal $V_{REF}$ and supplies it to the composite synchronizing signal generator 111.

The composite synchronizing signal generator 111 forms the composite synchronizing signal $C_{sync}$ using the signal $H_{REF}$ output from the H decoder 104 and the signal $V_{REF}$ output from the V decoder 110. The composite synchronizing signal $C_{sync}$ thus formed is output from output terminal 112, and is supplied to the synchronizing signal addition circuit 30 shown in FIG. 9.

The operation of the controller 107 in the FIG. 12 embodiment will now be explained.

First, an explanation will be provided of a case in which, in the comparator 106, the phase of the signal $C_{sync}$ supplied from the input terminal 101 advances from the phase of the signal $H_{REF}$ output from the H decoder 104. It is assumed that the signal $C_{sync}$ is advanced in phase from the signal $H_{REF}$ by the amount of 6 clocks when converted into the number of clock pulses output from the reference clock generator 102 shown in FIG. 12.

In the above-described case, signal C0 output from the comparator 106 to the controller 107 becomes a high level, and signal C1 becomes data indicating controller "6". The 107 generates select signals S0, S1 and S2 so as to reduce the phase difference between the signals $C_{sync}$ and $H_{REF}$, and controls the data selector 105.

That is, the controller 107 supplies the data selector 105 with select signals S0:0, S1:0 and S2:0. The data selector 105 selectively outputs the signal D0 output from the H decoder 104 when the H counter 103 has counted "224" to reset the H counter 103 and make the V counter 109 count up. Accordingly, the H counter 103 is reset at a timing earlier by 3 clocks than the preceding reset timing, and the signal $H_{REF}$ is output from the H decoder 104 at a timing earlier by 3 clocks than the preceding timing. As a result, the phase difference between the signals $C_{sync}$ and $H_{REF}$ is reduced by the amount of 3 clocks.

When the amount of the phase difference between the signals $C_{sync}$ and $H_{REF}$ is reduced by the amount of 3 clocks, the signal C0 output from the comparator 106 to the controller 107 remains a high level, while the signal C1 becomes data indicating "3". The controller 107 then outputs selects signals S0:0, S1:0 and S2:0 to the data selector 105, which selectively outputs the signal D0 output from the H decoder 104 when the H counter 103 has counted "224" to reset the H counter 103 and make the V counter 109 count up. The H counter 103 is then reset at a timing further earlier by 3 clocks than the preceding reset timing, and the signal $H_{REF}$ is output at a timing earlier by 3 clocks than the preceding timing. As a result, the amount of the phase difference between the signals $C_{sync}$ and $H_{REF}$ becomes zero.

At this time, the signal C0 output from the comparator 106 to the controller 107 remains a high level, while the signal C1 becomes data indicating "0". The controller 107 then outputs select signals S0:1, S1:0 and S2:0 to the data selector 105, which selectively outputs the signal D3 output from the H decoder 104 when the H counter 103 has counted "227" to reset the H counter 103 and make the V counter 109 count up. Accordingly, the H counter 103 is reset at the same timing as the preceding reset timing, and the signal $H_{REF}$ is output from the H decoder 104 at the same timing as the preceding timing. As a result, the amount of the phase difference between the signals $C_{sync}$ and $H_{REF}$ is maintained zero. At this time, the signal $C_{sync}$ formed by the composite synchronizing signal generator 111 shown in FIG. 12 using the signal $H_{REF}$ output from the H decoder 104 and the signal $V_{REF}$ output from the V decoder 110 coincide in phase with the signal $C_{sync}$ separated by the synchronizing signal separation circuit 33 shown in FIG. 9 and supplied to the comparator 106 via the input terminal 101 shown in FIG. 12.

Next, an explanation will be provided of a case in which, in the comparator 106, the signal $C_{sync}$ supplied from the input terminal 101 is delayed in phase from the signal $H_{REF}$ output from the H decoder 104.

In the above-described case, the signal C0 output from the comparator 106 to the controller 107 becomes a low level, and the signal C1 becomes data corresponding to the amount of the phase difference between the signals $C_{sync}$ and $H_{REF}$. The controller 107 then generates either one set of select signals S0:1, S1:0 and S2:0, S0:1, S1:0 and S2:1, and S0:1, S1:1 and S2:1 to control the data selector 105, which selectively outputs either one of the signal D4 output from the H decoder 104 when the H counter 103 has counted "228", the signal D5 output from the H decoder 104 when the counter 103 has counted "229", and the signal D6 output from the H decoder 104 when the H counter 103 has counted "230" to reset the H counter 103 and make the V counter 109 count up. Thus, the controller 107 controls the apparatus so that the phase difference between the signals $C_{sync}$ and $H_{REF}$ becomes zero by resetting the H counter 103 at a timing later than the preceding timing.

In the present embodiment, since the frequency of clock pulses supplied from the reference clock generator 102 to the H counter 103, as shown in FIG. 12, is the color subcarrier frequency (3.57945 MHz), the horizontal synchronizing period is a period when the H counter 103 counts "227.5". Accordingly, even if the phase difference between the horizontal synchronizing signal in the signal $C_{sync}$ input from the input terminal 101 and the signal $H_{REF}$ output from the H decoder 104 becomes zero, phase differences corresponding to 0.5 clock and 1 clock are produced after 1 H and 2 H, respectively. Hence, the controller 107 alternately generates either select signals S0:1, S1:1 and S2:0, or select signals S0:0, S1:0 and S2:1 at every horizontal synchronizing period to control the data selector 105. The data selector 105 alternately and selectively outputs the signal D3 output from the H decoder 104 when the H counter 103 has counted "227", and the signal D4 output from the H decoder 104 when the H counter 103 has counted at "228" every horizontal synchronizing period to reset the H counter 103 and make the V counter 109 count up. The corresponding signal $C_{sync}$ is output from the composite synchronizing signal generator 111, and is supplied to the synchronizing signal addition circuit 30 shown in FIG. 9 via the output terminal 112.

The signals "c" and "e" shown in FIG. 10 are supplied to the controller 107, which controls the output pattern of select signals to be output to the data selector 105 in accordance with these signals "c" and "e".

That is, when the magnetic head 22 shown in FIG. 9 traces a recorded track on the magnetic disk 21, the signal "b" output from the system controller 35 is a low level, and hence both the signal "c" output from the OR gate 42 shown in FIG. 10 and the signal "e" output from the D flip-flop 39 become low levels. At this time, select signals supplied from the controller 107 shown in FIG. 12 to the data selector 105 are any one of seven kinds of select signals from S0:0, S1:0 and S2:0 to S0:0, S1:1 and S2:1 in accordance with the signals C0 and C1 from the comparator 106. The data selector 105 selectively outputs one of the signals from D0 to D6 output from the H decoder 104 in accordance with the supplied select signals to control the horizontal synchronizing period of the signal $H_{REF}$ output from the H decoder 104 within a range of 227±3 clocks.

When the track on the magnetic disk 21 traced by the magnetic head 22 shown in FIG. 9 is moved from a recorded track to an unrecorded track by the head moving mechanism 25, the signal "b" output from the system controller 35 becomes a high level from a low level. The signal "c" output from the OR gate 42 shown in FIG. 10 and the signal "e" output from terminal D of the D flip-flop 39 change from low levels to high levels at the timing that the PG pin 36 shown in FIG. 9 subsequently passes the PG coil 37 to command the start of the muting operation by the muting circuit 29 shown in FIG. 9. At this time, the controller 107 shown in FIG. 12 alternately supplies the data selector 105 with select signals S0:1, S1:1 and S2:0 and select signals S0:0, S1:0 and S2:1 at every horizontal synchronizing period irrespective of the signals C0 and C1 from the comparator 106. The data selector 105 selectively outputs either the signal D3 or D4 output from the H decoder 104 in accordance with the supplied select signals to reset the H counter 3. The signal $H_{REF}$ having an average horizontal synchronizing period of 227.5 clocks is thereby output from the H decoder 104. Thus, the composite synchronizing signal generator 111 shown in FIG. 12 can form the signal $C_{sync}$ even if the magnetic head 22 shown in FIG. 9 traces an unrecorded track on the magnetic disk 21.

When the track on the magnetic disk 21 shown in FIG. 9 traced by the magnetic head 22 is changed from an unrecorded track to a recorded track by the head moving mechanism 25, the signal "b" output from the system controller 35 becomes a low level from a high level, the signal "e" output from Q terminal of the D flip-flop 39 shown in FIG. 10 changes from a high level to a low level at the timing that the PG pin 36 shown in FIG. 9 subsequently passes the PG coil 37, and the signal "c" output from the OR gate 42 remains a high level. At this time, select signals to be supplied from the controller 107 shown in FIG. 12 to the data selector 105 in accordance with the signals C0 and C1 from the comparator 106 are limited to either one of four kinds of select signals; S0:0, S1:1 and S2:0, S0:1, S1:1 and S2:0, S0:0, S1:0 and S2:1, and S0:1, S1:0 and S2:1, in accordance with the signals C0 and C1 from the comparator 106. The data selector 105 selectively outputs one of the signals from D2 to D5 output from the H decoder 104 in accordance with the supplied select signals, and controls the horizontal synchronizing period of the signal $H_{REF}$ output from the H decoder 104 within a range of "226 clocks", "227 clocks", "228 clocks" and "229 clocks". The signal "b" output from the system controller 35 shown in FIG. 9 thereby changes from a high level to a low level. During a period from the moment the PG pin 36 passes the PG coil 37 to the moment the PG pin 36 subsequently passes the PG coil 37, the controller 107 controls so that the phase of the signal $C_{sync}$ output from the composite synchronizing signal generator 111 coincides with the phase of the signal $C_{sync}$ supplied from the comparator 106 shown in FIG. 12 at a control response speed slower than the phase control response speed when the magnetic head 22 shown in FIG. 9 traces a recorded track on the magnetic disk 21 as described above.

After the PG pin 36 shown in FIG. 9 has passed the PG coil 37, both the signal "c" output from the OR gate 42 shown in FIG. 10 and the signal "e" output from terminal Q of the D flip-flop 39 become low levels. One of the signals D0–D6 is selectively output from the data selector 105 shown in FIG. 10 as in the case wherein the magnetic head 22 traces a recorded track on the magnetic disk 21 as described above, and the phase of the signal $C_{sync}$ output from the composite synchronizing signal generator 111 is controlled with a high response speed.

As described above, the signal $C_{sync}$ generated from the composite synchronizing signal generator 111 is formed by different phase control operations, for a case wherein the signal reproduced from the magnetic disk 21 shown in FIG. 9 by the magnetic head 22 is subjected to muting, for one vertical synchronizing period from the moment the muting is released, and for a case wherein muting is not performed.

As explained above, in the present embodiment, by forming a new composite synchronizing signal synchronized in phase with the composite synchronizing signal separated from the image signal reproduced from the magnetic disk, and by replacing the composite synchronizing signal added to the reproduced image signal with the new composite synchronizing signal, it becomes possible to form and output a reproduced image signal which maintains continuity of horizontal synchronizing signals even if skew compensation is performed.

Furthermore, in the present embodiment, when the magnetic head tracing a recorded track is moved, passed over an unrecorded track on the magnetic disk, then moved to the next recorded track to perform reproduction, the signal reproduced by the magnetic head is subjected to muting while the magnetic head traces the unrecorded track, and the counter for forming a composite synchronizing signal synchronizing with the synchronizing signal added to the reproduced image signal is subjected to free running to form and output the composite synchronizing signal. It becomes thereby possible to supply the signal reproduced by and output from the apparatus, for example, to another apparatus, such as a monitoring apparatus or the like, and to shorten the draw-in time for the phase when the other apparatus is subjected to synchronizing operation by the composite synchronizing signal separated from the image signal reproduced by and output from the apparatus.

Moreover, in the present embodiment, even when the signal reproduced from the magnetic disk is subjected to muting before moving the magnetic head, and the phase of the composite synchronizing signal generated at the time of muting is deviated by ½ H from the phase of the composite synchronizing signal in the image signal reproduced from the magnetic disk after moving the magnetic head, it becomes possible to maintain continuity of the composite synchronizing signal without producing an abrupt disturbance in the phase of the composite synchronizing signal by performing phase synchronizing control with a slow response speed for one vertical synchronizing period before releasing the muting operation.

Although the apparatus of the present embodiment has been explained illustrating a still video reproducing apparatus corresponding to a television signal of the NTSC system, the present invention is not limited thereto, but may also be applied to a still video reproducing apparatus corresponding to television signals of the PAL or SECAM system. In this case, the magnetic disk may be rotated at a speed of 3000 rpm, and the clock frequency of the reference clock generator within the timing signal generator 14 shown in FIG. 9 and reset timings of the H counter and the V counter may be set so as to correspond to television signals of the PAL or SECAM system.

Although, in the present embodiment, the apparatus is configured so that the phase of the composite synchronizing signal generated from the composite synchronizing signal generator 111 shown in FIG. 12 is controlled by resetting the H counter 103 by one of the signals D0–D6 output from the H decoder 104 in accordance with seven kinds of count values from the H counter 103, the control range and control speed for the phase can be arbitrarily set by increasing or reducing the number of kinds of the signals output from the H decoder 104 in accordance with the count value from the H counter 103.

Although, in the present embodiment, the apparatus is configured so that phase synchronizing control is performed at a slow response speed for one vertical synchronizing period before releasing the muting operation, the period is not limited to one vertical synchronizing period, but the phase synchronizing control may be performed for a few vertical synchronizing periods.

Furthermore, even in a case in which the phase of the composite synchronizing signal in the image signal reproduced before moving the magnetic head and the phase of the composite synchronizing signal in the image signal reproduced after moving the magnetic head are deviated by ½ H from each other, by providing a muting period while moving the magnetic head reproducing an image signal from a recorded track on the magnetic disk to another recorded track, and performing phase synchronizing control at a slow response speed for one vertical synchronizing period before releasing the muting, the phases can be synchronized with each other during one vertical synchronizing period before releasing the muting, whereby it becomes possible to maintain continuity of the composite synchronizing signals without producing abrupt disturbance in the composite synchronizing signals.

As explained above, according to the present embodiment, it is possible to maintain continuity of horizontal synchronizing signals even after skew compensation processing, and to arrange so that the phases of the composite synchronizing signals do not abruptly change even while reproducing tracks are switched.

A fourth embodiment of the present invention will now be explained.

Figure 14:
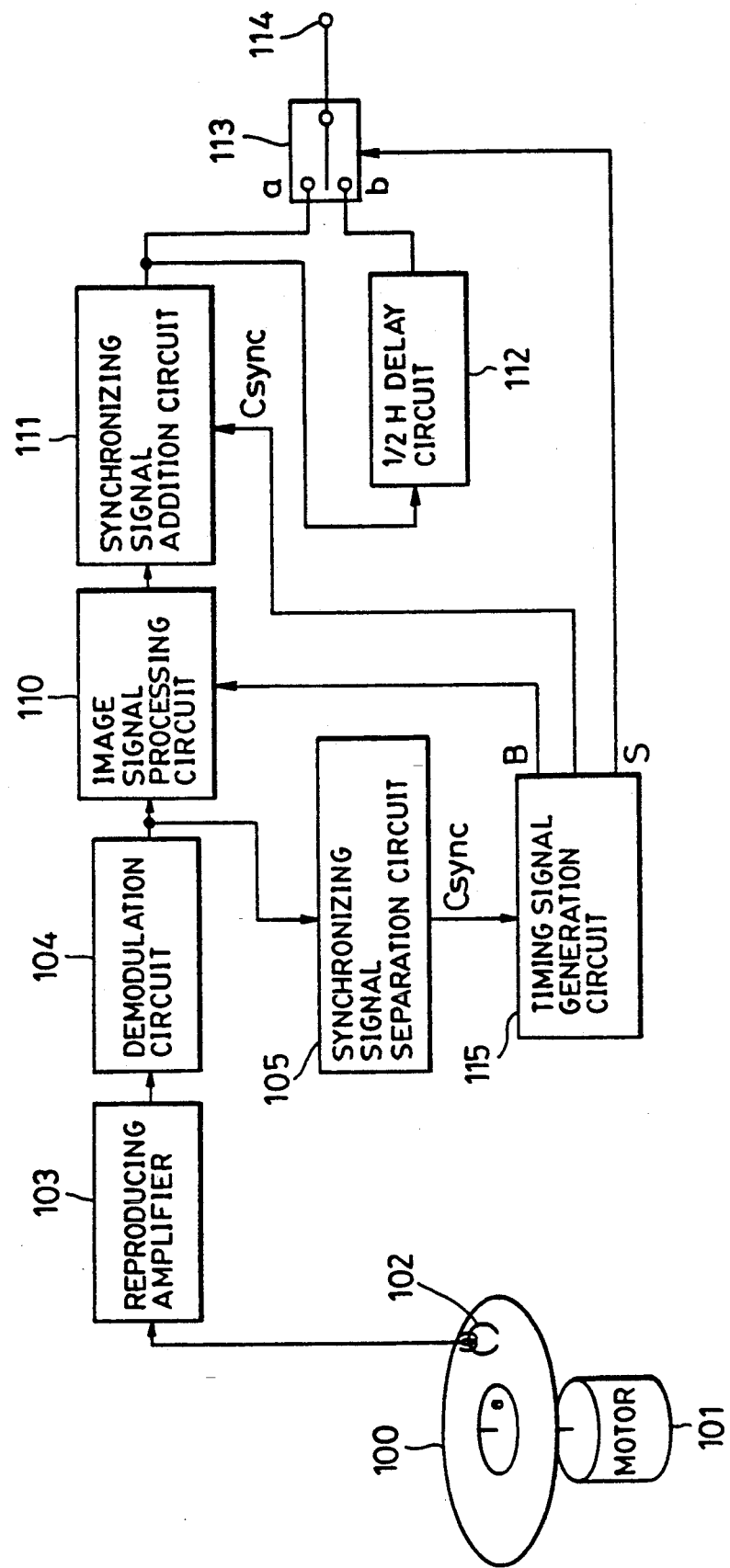
FIG. 14 is a diagram showing the schematic configuration of a still video reproducing apparatus, representing a fourth embodiment of the present invention, for handling still-picture image signals conforming to television signals of the NTSC system, serving as a fourth embodiment of the present invention.

FIG. 14 is a diagram showing the schematic configuration of a still video reproducing apparatus, representing a fourth embodiment of the present invention, for handling a still-picture image signal conforming to a television signal of the NTSC system. In FIG. 14, like configurations as those in FIG. 1 are indicated by like numerals, and a detailed explanation thereof will be omitted.

Figure 1:
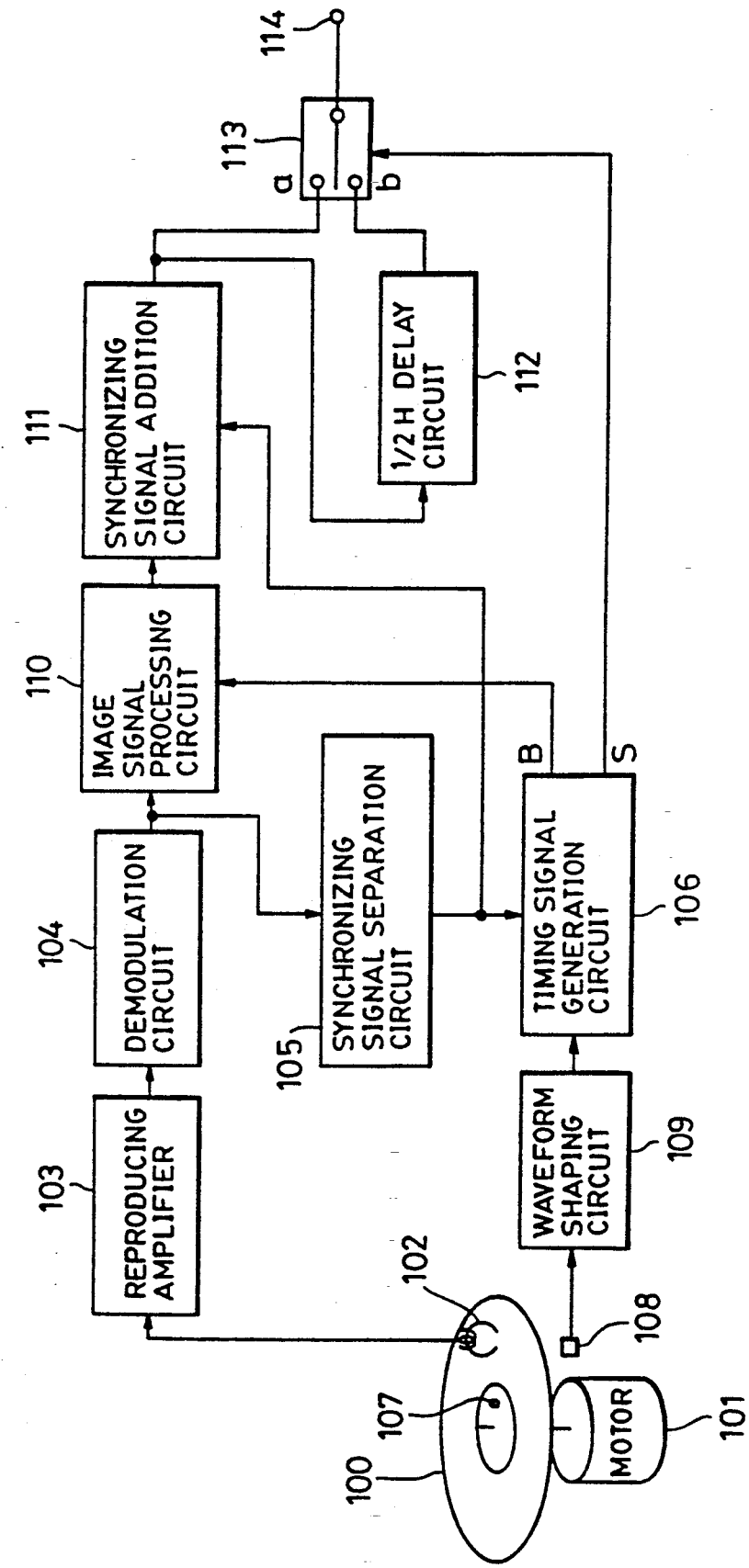
FIG. 1 is a diagram showing the schematic configuration of a conventional still video reproducing apparatus.
Figure 2A:
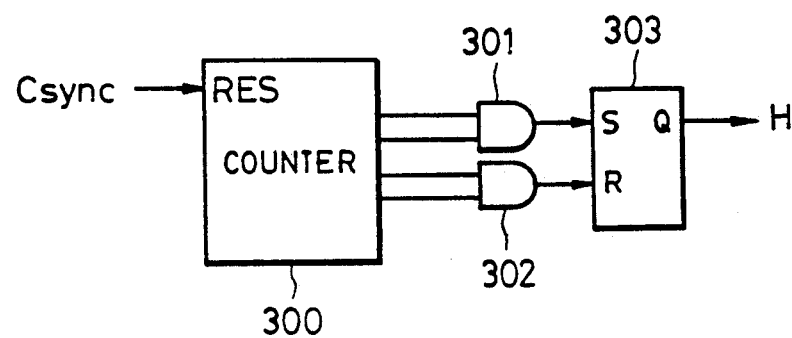
FIGS. 2(a) and 2(b) show an example of the configuration of a synchronizing signal generator in a still video recording apparatus and a timing chart indicating the operation thereof, respectively.
Figure 2B:
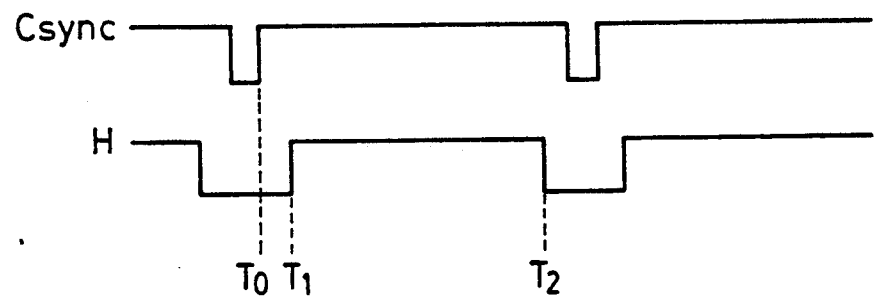

In the FIG. 14 embodiment, as in the conventional example shown in FIG. 1, a signal reproduced by the magnetic head 102 from the magnetic disk 100 rotated by the motor 101 is amplified by the reproducing amplifier 103. The amplified reproduced signal is demodulated by the demodulating circuit 104, and is supplied to the synchronizing signal separation circuit 105 and the image signal processing circuit 110.

The synchronizing signal separation circuit 105 separates the composite synchronizing signal $C_{sync}$ from the signal supplied from the demodulation circuit 104. The separated signal $C_{sync}$ is supplied to a timing signal generation circuit 115.

As described above, in contrast to the conventional example shown in FIG. 1 wherein the signal $C_{sync}$ separated by the synchronizing signal separation circuit 105 is added to the image signal supplied from the image signal processing circuit 110 in the synchronizing signal addition circuit 111, in the present embodiment a signal $C_{sync}$ formed in the timing signal generation circuit 115 is added to the image signal.

Figure 15:
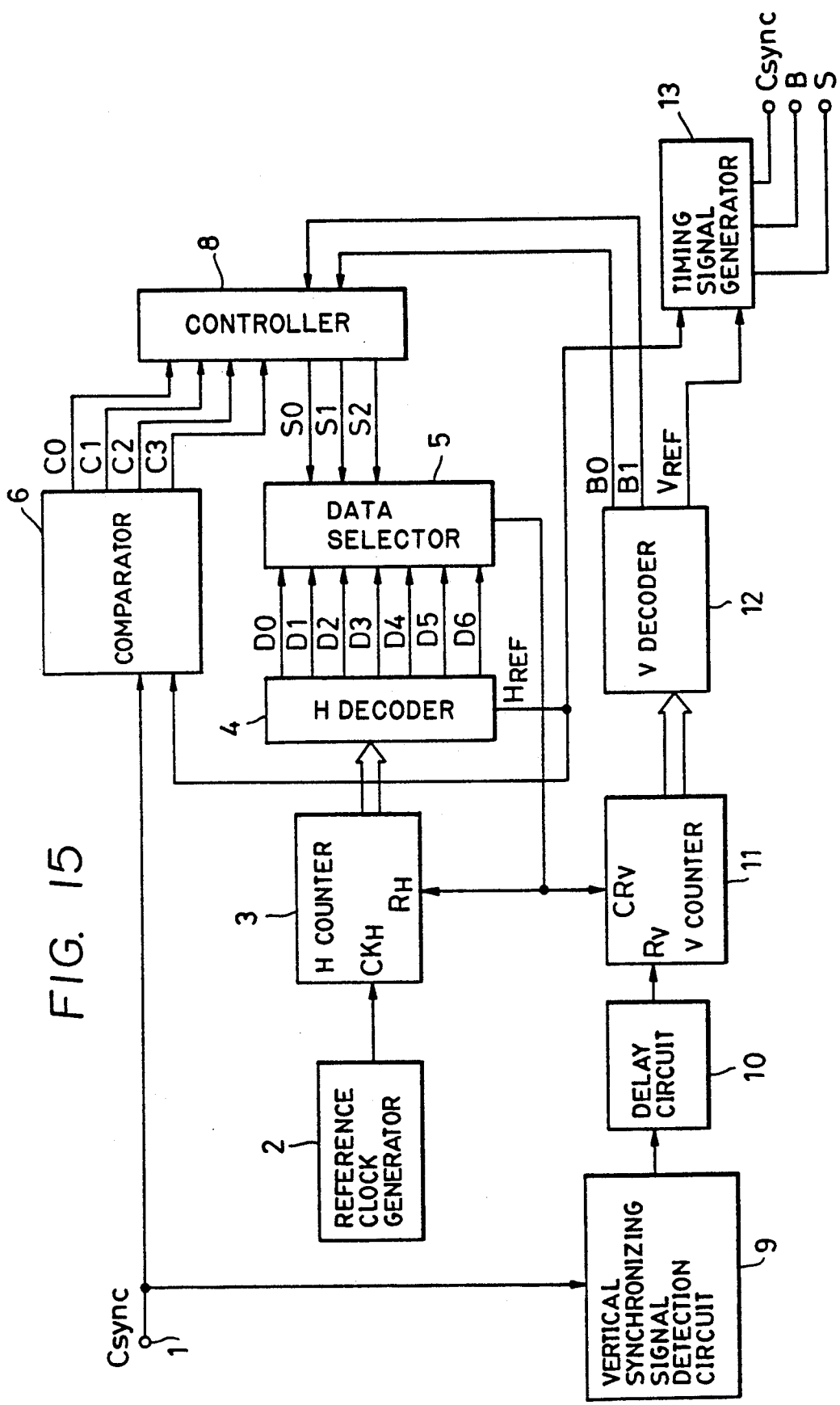
FIG. 15 is a diagram showing an example of the configuration of the timing signal generation circuit shown in FIG. 14.

FIG. 15 is a diagram showing an example of the configuration of the timing signal generation circuit 115 shown in FIG. 14. In FIG. 15, like components as those shown in FIG. 4 are indicated by like numerals.

In FIG. 15, the composite synchronizing signal $C_{sync}$ (see FIG. 5) reproduced from the magnetic disk 100 shown in FIG. 14 is input to input terminal 1, and is supplied to the comparator and the vertical synchronizing signal detection circuit 9.

Clock pulses having the color subcarrier frequency (3.58 MHz (megahertz)) are generated from the reference clock generator 2, and are supplied to clock-pulse input terminal $CK_H$ of the horizontal synchronizing counter (H counter) 3.

The H counter 3 counts the number of clock pulses input from the clock-pulse input terminal $CK_H$, and supplies the H decoder 4 with the data of the count value (see FIG. 5).

The H decoder 4 makes the level of each of output signals D0–D6 a high level or a low level in accordance with the data of the count value supplied from the H counter 3, and supplies the data selector 5 with the resultant signals.

The H decoder 4 shown in FIG. 15 is configured in the following manner. That is, when the data of the count value supplied from the H counter 3 indicate "226−16=210", output signal D0 is made a high level. When the data of the count value indicate "226−4=222", output signal D1 is made high level. When the data of the count value indicate "226−1=225", output signal D2 is made a high level. When the data of the count value indicate "226+16=242", output signal D3 is made a high level. When the data of the count value indicate "226+4=230", output signal D4 is made a high level. When the data of the count value indicate "226", output signal D5 is made a high level. When the data of the count value indicate "113", output signal D6 is made a high level. When the data of the count value indicate "50", output signal $H_{REF}$ (see FIG. 5) is made a high level.

The data selector 5 outputs one of the signals D0–D6 supplied from the H decoder 4 in accordance with select signals S0–S2 output from the controller 8, and supplies reset terminal $R_H$ of the H counter 3 with the signal to reset the H counter 3. The signal is also supplied to input terminal $CK_v$ of the vertical synchronizing counter (V counter) 11.

The output signal $H_{REF}$ from the H decoder 4 is supplied to the comparator 6. The comparator 6 detects the phase difference between the signal $H_{REF}$ and the signal $C_{sync}$ supplied from the input terminal 1, and makes the level of each of its output signals C0–C3 a high level or a low level in accordance with the phase difference, and supplies the controller 8 with the resultant signals.

That is, the comparator 6 makes the output signal C1 a high level when the phase of the signal $C_{sync}$ advances from the phase of the signal $H_{REF}$, and makes the signal C1 a low level when the phase of the signal $C_{sync}$ is delayed.

The comparator 6 is configured so as to make the level of each of the output signals C0, C2 and C3 a high level or a low level in accordance with the amount of the phase difference between the supplied signals $C_{sync}$ and $H_{REF}$. That is, when the phase difference between the signals $C_{sync}$ and $H_{REF}$ is equal to or more than 8 clocks when converted into the number of clock pulses output from the reference clock generator 2, the output signal C0 is made a high level. When the phase difference corresponds to 4–8 clocks, the output signal C2 is made a high level. When the phase difference corresponds to 0–4 clocks, the output signal C3 is made a high level. The levels of these output signals are held for one horizontal synchronizing period.

As described above, the signal $C_{sync}$ (see FIG. 6) input from the input terminal 1 is also supplied to the vertical synchronizing signal detection circuit 9, which detects a vertical synchronizing blanking period (corresponding to "b" in FIG. 6) in the supplied vertical synchronizing signal.

That is, as shown in FIG. 6, the vertical synchronizing blanking period ("b" in FIG. 6) stays a low level longer than the horizontal synchronizing blanking period ("a" in FIG. 6). Hence, the vertical synchronizing signal detection circuit 9 counts a period during which the level of the supplied signal $C_{sync}$ is low, makes the output signal a high level when the count value has indicated a period longer than the horizontal synchronizing blanking period ("a" in FIG. 6,), and supplies the signal to the delay circuit 10 in the following stage.

The delay circuit 10 delays the output signal from the vertical synchronizing signal detection circuit 9 by a few H (H is a horizontal synchronizing period). The delayed signal is supplied to reset terminal $R_v$ of the vertical synchronizing counter (V counter) 11, which is reset while the signal supplied from the delay circuit 10 is a high level.

Equalizing pulses are added to the signal $C_{sync}$ input from the input terminal 1. During the period of the equalizing pulses ("c" in FIG. 6) in the signal $C_{sync}$, timing signals different from those during the other period are formed according to the data of the count values by the H counter 3 and the V counter 11 by the H decoder 4 and the V decoder 12. Hence, if the vertical synchronizing signal detection circuit 9 has detected the vertical blanking period and the V counter 11 were reset during the period of the equalizing pulses as described above, there is the possibility that the continuity of the timing signals formed during the equalizing pulses would be destroyed. Accordingly, in the present embodiment, the apparatus is configured so that the V counter 11 is reset at a timing sufficiently delayed from the period of the equalizing pulses in the signal $C_{sync}$ by delaying the output signal from the vertical synchronizing signal detection circuit 9 by a few Hs by the delay circuit 10, as described above.

As described above, the output signal from the data selector 5 is supplied to the clock-pulse input terminal $CK_v$ of the V counter 11. the V counter 11 counts the number of supply of high-level signals output from the data selector 5, and outputs the data of the count value to the V decoder 12.

When the data of the count value supplied from the V counter 11 has reached the number of horizontal synchronizing pulses during the period of one field (that is, 263), the V decoder 12 outputs a pseudo vertical synchronizing signal $V_{REF}$. When the data of the count value supplied from the V counter 11 has reached a predetermined count value, the V decoder makes the output signal B0 a high level, and supplies the signal to the controller 8.

As shown in FIG. 14, the still video recording and reproducing apparatus in the present embodiment is configured so that the magnetic disk 100 is rotated by the motor 101 and a still-picture image signal for a period of one field is recorded on one of the recording tracks concentrically formed on the magnetic disk 100.

The motor 101 is controlled by a motor servo circuit or the like so as to be rotated at a predetermined rotation speed. However, since it is impossible to perfectly remove uneven rotation and the like, a position to start recording a still-picture image signal and a position to stop the recording on the magnetic disk 100 do not exactly coincide with each other, and there is the possibility that unrecorded portions or overlapped recorded portions are produced.

In the above-described case, as shown by "d" in FIG. 6, the period of the horizontal synchronizing signal is not 1 H at a position corresponding to the switching point between the position to start recording the still-picture image signal and the position to stop the recording in the signal $C_{sync}$ separated from the still-picture image signal reproduced from the magnetic disk 100, and so the phase difference between the signals $C_{sync}$ and $H_{REF}$ at this portion becomes large.

Accordingly, the V decoder 12 in the present embodiment makes its output signal B1 a high level when the data of the count value supplied from the V counter 11 has reached a count value corresponding to a point near the above-described switching point (a period of a few Hs) in the signal $C_{sync}$, and supplies the controller 8 with the signal.

The operation of inputting and outputting signals by the controller 8 in the FIG. 15 embodiment will now be explained by reference to the operation flowchart shown in FIG. 16.

In FIG. 15, the signal $C_{sync}$ input from the input terminal 1 and the signal $H_{REF}$ output from the H decoder 4 are supplied to the comparator 6, where the phase difference between the two signals is detected. The comparator 6 supplies the controller 8 with one of the signals C0–C3 corresponding to the detected phase difference (see step $ST_1$ in FIG. 16).

The V counter 11 counts output signals from the data selector 5 and outputs the data of the count value to the V decoder 12, which makes its output signals B0 and B1 high level when the data of the count value supplied from the V counter 11 has reached a predetermined count value. When the V counter 11 has counted "262", the signal B0 output from the V decoder 12 becomes a high level, and the controller 8 outputs select signals S0:1, S1:1 and S2:1 to the data selector 5, which selectively outputs the signal D6 output from the H decoder 4 when the H counter 3 has counted "113" to reset the H counter 3 and make the V counter 11 count up.

When, for example, the composite synchronizing signal to be handled conforms to the television signal of the NTSC system, the one-field period is "262.5 H". In the above-described operation, since the H counter 3 is reset at a period half (that is, a period for 113 clocks) the normal 1-H period (a period for 226 clocks when converted into the number of clock pulses output from the reference clock generator 2), the signal $H_{REF}$ output from the H decoder 4 can be synchronized with the signal $C_{sync}$ even at a portion where a period for one field ends.

When the V counter 11 has counted a count value corresponding to a point near the switching point in the signal $C_{sync}$, the signal B1 output from the V decoder 12 becomes a high level. The controller 8 then alternately outputs select signals S0:1, S1:1 and S2:0, and S0:1, S1:0 and S2:1 to the data selector 5 at every 1-H period irrespective of the signals C0–C3 corresponding to the phase difference between the signals $C_{sync}$ and H REF output from the comparator 6. When the H counter 3 has counted "225" or "226", the data selector 5 alternately and selectively outputs the signals D2 and D5 output from the H decoder 4 at every 1-H period to reset the H counter 3 and make the V counter 11 count up (see steps $ST_5$–$ST_7$ in FIG. 16).

By the above-described operation, the signal $H_{REF}$ output from the H decoder 4 can synchronize with the signal $C_{sync}$ at a position corresponding to the switching point on the magnetic disk 100 shown in FIG. 14.

When both the signals B0 and B1 output from the V decoder 12 are low levels, the controller 8 outputs select signals S0–S2 corresponding to the signals C0–C3 output from the comparator 6 in accordance with the direction (that is, advanced or delayed) of the phase difference between the signals $C_{sync}$ and $H_{REF}$ and the amount of the phase difference.

When the comparator 6 has detected that the amount of the phase difference between the signals $C_{sync}$ and $H_{REF}$ corresponds to 0–4 clocks when converted into the number of clock pulses output from the reference clock generator 2, the signals C0 and C2 become low levels, and the signal C3 becomes a high level. When the phase of the signal $C_{sync}$ advances from the phase of the signal $H_{REF}$, the signal C1 becomes a high level. The controller 8 then outputs select signals S0:0, S1:1 and S2:0 to the data selector 5, which selectively outputs the signal D2 output from the H decoder 4 when the H counter 3 has counted "225". When the phase of the signal $C_{sync}$ delays from the phase of the signal $H_{REF}$, the signal C1 becomes a low level. The controller 8 then outputs select signals S0:1, S1:0 and S2:1 to the data selector 5, which selectively outputs the signal D5 output from the H decoder 4 when the H counter 3 has counted "226" to reset the H counter 3 and make the V counter 11 count up (see steps $ST_8$–$ST_{14}$ in FIG. 16).

By the above-described operation, the H counter 3 is reset at a timing shorter for a period of one clock than the normal reset period (a period for 226 clocks when converted into the number of clock pulses output from the reference clock generator 2) by the signal D2 or D5 output from the data selector 5. Hence, it becomes possible to make the signal $H_{REF}$ output from the H decoder 4 close in phase and synchronize with the signal $C_{sync}$.

When the comparator 6 has detected that the amount of the phase difference between the signals $C_{sync}$ and $H_{REF}$ corresponds to 4–8 clocks when converted into the number of clock pulses output from the reference clock generator 2, the signal C0 becomes a low level and the signal C2 becomes a high level. When the phase of the signal $C_{sync}$ is advanced from the phase of the signal $H_{REF}$, the signal C1 becomes a high level. The controller 8 then outputs select signals S0:1, S1:0 and S2:0 to the data selector 5, which selectively outputs the signal D1 output from the H decoder 4 when the H counter 3 has counted "222". When the phase of the signal $C_{sync}$ is delayed from the phase of the signal $H_{REF}$, the signal C1 becomes a low level. The controller 8 then outputs select signals S0:0, S1:0 and S2:1 to the data selector 5, which selectively outputs the signal D4 output from the H decoder 4 when the H counter 3 has counted "230" to reset the H counter 3 and make the V counter 11 count up (see steps $ST_8$, $ST_9$, and $ST_{15}$–$ST_{19}$ in FIG. 16).

By the above-described operation, since the H counter 3 is reset at a timing shorter or longer for a period of 4 clocks than the normal reset period (a period for 226 clocks when converted into the number of clock pulses output from the reference clock generator 2) by the signal D1 or D4 output from the data selector 5, it becomes possible to make the signal $H_{REF}$ output from the H decoder 4 close to in phase and synchronized with the phase of the signal $C_{sync}$.

When the comparator 6 has detected that the amount of the phase difference between the signals $C_{sync}$ and $H_{REF}$ is equal to or more than 8 clocks when converted into the number of clock pulses output from the reference clock generator 2, the signal C0 becomes a high level.

In the present embodiment, when the comparator 6 has detected that the amount of the phase difference between the signals $C_{sync}$ and $H_{REF}$ corresponds to not less than 8 clocks when converted into the number of clock pulses output from the reference clock generator 2, it is assumed that noise has been added to the signal $C_{sync}$ or a dropout has occurred.

If the phase of the signal $C_{sync}$ advances from the phase of the signal $H_{REF}$ the signal C1 becomes a high level. The controller 8 then outputs select signals S0:0, S1:0 and S2:0 to the data selector 5, which selectively outputs the signal D0 output from the H decoder 4 when the H counter 3 has counted "210". If the phase of the signal $C_{sync}$ is delayed from the phase of the signal $H_{REF}$, the signal C1 becomes a low level. The controller 8 then outputs select signals S0:1, S1:1 and S2:0 to the data selector 5, which selectively outputs the signal D3 output from the H decoder 4 when the H counter 3 has counted ¢242" to reset the H counter 3 and make the V counter 11 count up (see steps $ST_8$ and $ST_{20}$–$ST_{27}$ in FIG. 16).

By the above-described operation, the H counter 3 is reset at the normal reset period (a period corresponding to 226 clocks when converted into the number of clock pulses output from the reference clock generator 2) by the signal D5 output from the data selector 5 even if the signal $C_{sync}$ becomes in an abnormal state. Hence, the H counter 3 becomes in a free-running state. When the abnormal state has continued for a period of 3 Hs, the H counter 3 is reset at a timing shorter or longer for a period of 16 clocks than the normal reset period (a period corresponding to 226 clocks when converted into the number of clock pulses output from the reference clock generator 2) by one of the signals D0–D3 output from the data selector 5. Hence, it becomes possible to make the signal $H_{REF}$ output from the H decoder 4 close to in phase and synchronize with the signal $C_{sync}$.

Figure 16B:
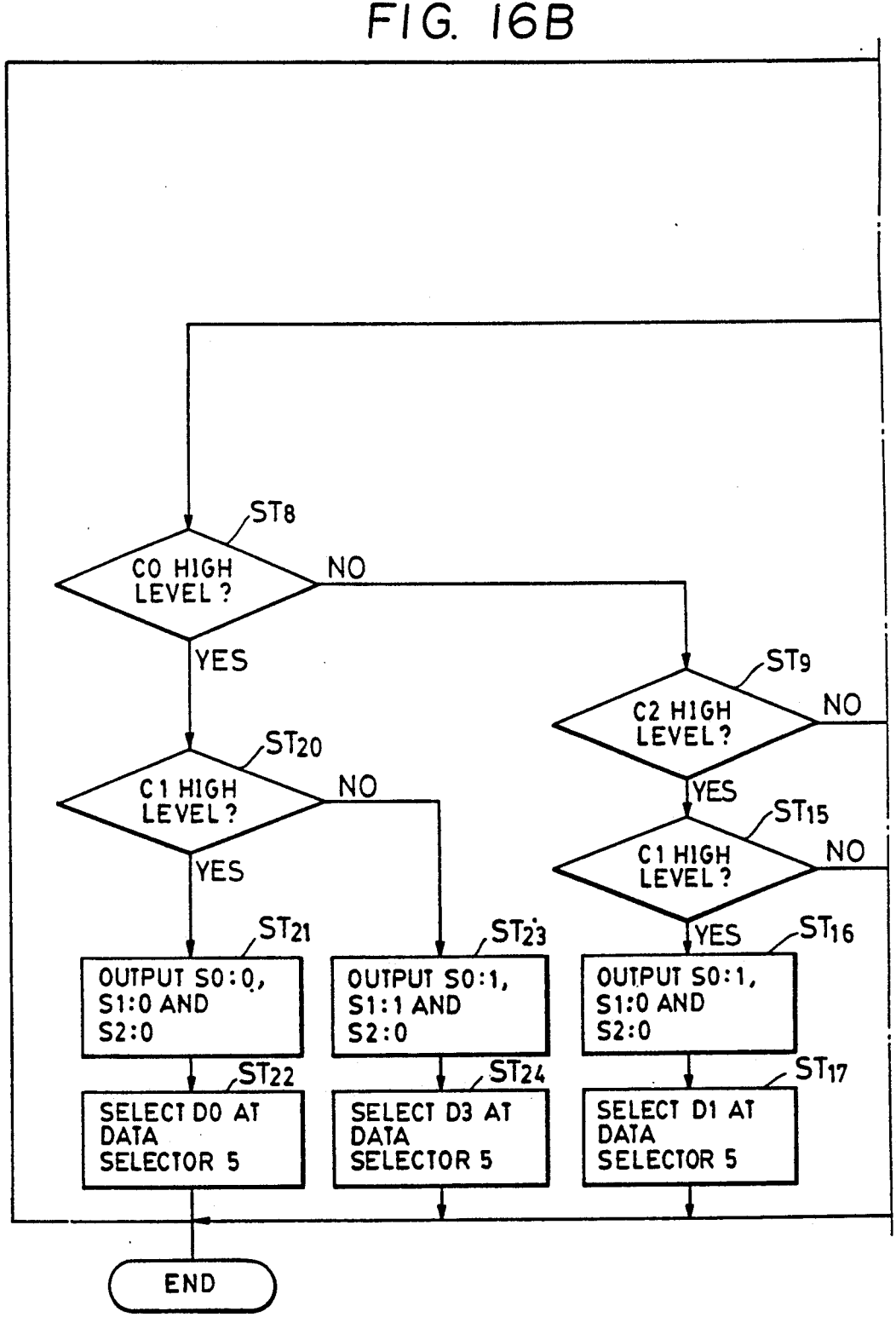
FIG. 16, composed of FIGS. 16A and 16B, is an operation flowchart for explaining the operation of the timing signal generation circuit shown in FIG. 15.

After the data selector 5 has output one of the signals D0–D6 output from the H decoder 4, each of the above-described operations returns again to step $ST_1$ in FIG. 16, where the phases of the signals $C_{sync}$ and $H_{REF}$ are compared with each other by the comparator 6, and the above-described operations are further repeated.

The signal $H_{REF}$ generated from the H decoder 4 and the signal $V_{REF}$ generated from the V decoder 12 as described above are supplied to a timing signal generator 13, which forms and outputs the composite synchronizing signal $C_{sync}$, a blanking signal B having a preset pulse width, and a skew compensation gate signal S using pulses of the supplied signals $H_{REF}$ and $V_{REF}$ as triggers.

The blanking signal B, composite synchronizing signal $C_{sync}$ and skew compensation gate signal S thus formed are supplied to the image signal processing circuit 110, synchronizing signal addition circuit 111 and change-over switch 113, respectively.

The image signal processing circuit 110 performs horizontal and vertical blanking processing for the image signal supplied from the demodulation circuit 104 in accordance with the blanking signal B supplied from the timing signal generation circuit 115. The synchronizing signal addition circuit 111 adds the composite synchronizing signal C$_{sync}$ formed in the timing signal generation circuit 115 to the image signal for one field subjected to blanking processing by the image signal processing circuit 110 in the preceding stage, and supplies the ½ H delay circuit 112 and terminal "a" of the change-over switch 113 with the resultant image signal. The ½ H delay circuit 112 delays the supplied image signal by a period of ½ H, and supplies terminal "b" of the changer-over switch 113 with the delayed image signal.

The change-over switch 113 alternately switches the connection between the side of terminal "a" and the side of terminal "b" shown in FIG. 14 at every one-field period in accordance with the skew compensation gate signal S formed in the timing signal generation circuit 115, and outputs image signals for respective frames from the output terminal 114.

As described above, in contrast to the conventional case in which the composite synchronizing signal separated from the image signal reproduced from the magnetic disk is added to the reproduced image signal subjected to skew compensation processing in the present embodiment, a composite synchronizing signal synchronizing in phase with the composite synchronizing signal separated from the reproduced image signal is formed, and a skew compensation gate signal for controlling skew compensation processing is also formed. The composite synchronizing signal formed as described above is added to the reproduced image signal, and skew compensation processing is then performed for the reproduced image signal to which the formed composite synchronizing signal is added in accordance with the skew compensation gate signal. Thus, it becomes possible to maintain continuity of horizontal synchronizing signals at the boundary point between consecutive fields, and therefore to prevent deterioration in the composite synchronizing signal.

Furthermore, since the apparatus is also configured so that the phase of the reproducing timing signal is not instantaneously corrected even if the signal C$_{sync}$ has changed, but is corrected step by step by a predetermined amount, it becomes possible to obtain a stable reproducing timing signal without being disturbed by external disturbance, such as noise and the like.

Moreover, since the circuit configuration is digitized as shown in the present embodiment, adjustment and the like become unnecessary, and a stable performance can be obtained against changes in environment, such as temperature, humidity and the like. In addition, since the the circuit scale is small, the circuitry can easily be made by ICs integrated circuits), and so it becomes possible to reduce the mounted area in the apparatus, the number of components, and the like.

Although, in the present embodiment, an explanation has been provided of the still video reproducing apparatus for handling a still-picture image signal conforming to a television signal of the NTSC system, the present invention is not limited thereto. For example, an apparatus conforming to a television signal of the PAL or SECAM system may also be realized by an identical configuration. In this case, in order to coincide with the corresponding system, the length of one horizontal synchronizing period and the length of one vertical synchronizing period, that is, timings to reset the H counter 3 and the V counter 11 shown in FIG. 15, may be changed.

As explained above, according to the present embodiment, it is possible to maintain continuity of horizontal synchronizing signals even after skew compensation processing, and therefore to output a composite synchronizing signal not having deterioration together with a reproduced image signal.

What is claimed is:

1. A synchronizing signal generator for forming various kinds of timing signals synchronized with an input synchronizing signal, comprising:
   (A) a clock signal generator for generating clock signals;
   (B) a counter for counting the clock signals generated by said clock signal generator in accordance with a count period and for outputting the result of count;
   (C) a timing signal generator for generating various kinds of timing signals including a pseudo-vertical-synchronizing signal in accordance with the result of count by said counter; and
   (D) a phase control circuit for comparing a phase of at least one of the timing signals generated by said timing signal generator with a phase of the input synchronizing signal and for controlling said count period in said counter in accordance with the result of comparison.

2. A synchronizing signal generator according to claim 1, wherein said pseudo vertical synchronizing signal generator is arranged so that a period employed to generate the pseudo vertical synchronizing signal is controlled by a vertical synchronizing signal separated from the input synchronizing signal and delayed by a predetermined period.

3. A synchronizing signal generator for forming various kinds of timing signals synchronized with an input synchronizing signal, comprising:
   (A) a clock signal generator for generating clock signals;
   (B) a first timing signal generator for counting the clock signals generated by said clock signal generator in accordance with a count period and for generating first timing signals in accordance with the result of its count;
   (C) a second timing signal generator for counting the first timing signals generated by said first timing signal generator and for generating second timing signals in accordance with the result of its count;
   (D) a control circuit for comparing a phase of one of the first timing signals generated by said first timing signal generator with a phase of an input first synchronizing signal, for controlling said count period in said first timing signal generator in accordance with the result of comparison, and for placing said second timing signal generator in a free-running state for a predetermined period.

4. A synchronizing signal generator according to claim 3, wherein the first timing signal generator includes a first counter which counts clock signals generated from said clock signal generator, said first timing signal generator generating the first timing signals in accordance with the result of count.

5. A synchronizing signal generator according to claim 3, wherein said first synchronizing signal includes a horizontal synchronizing signal.

6. A synchronizing signal generator according to claim 3, wherein the second timing signal generator includes a second counter to be reset in synchronization with an input second synchronizing signal which counts the first timing signals generated from said first timing signal generator, said second timing signal generator generating the second timing signals in accordance with the result of count.

7. A synchronizing signal generator according to claim 6, wherein said second synchronizing signal includes a vertical synchronizing signal.

8. A synchronizing signal generator according to claim 6, wherein said control circuit prohibits said second counter from being reset in synchronization with said second synchronizing signal during said predetermined period.

* * * * *

UNITED STATES PATENT AND TRADEMARK OFFICE
CERTIFICATE OF CORRECTION

PATENT NO. : 5,305,106

DATED : April 19, 1994

INVENTOR(S) : NOBUO FUKUSHIMA ET AL.

Page 1 of 3

It is certified that error appears in the above-identified patent and that said Letters Patent is hereby corrected as shown below:

Title page,
AT [56] REFERENCES CITED

Other Publications, Pat. Abs. Japan, vol. 10, "for JP 14" should read --for JP- --.

COLUMN 1

Line 53, "apparatus," should read --apparatus.--.

COLUMN 3

Line 67, "a" should be deleted.

COLUMN 7

Line 60, "Supplied" should read --supplied--.

COLUMN 19

Line 37, "terminal CKH" should read --terminal $CK_H$--.
    Line 68, "terminal RH" should read --terminal $R_H$--.

COLUMN 20

Line 20, "a" should be deleted.

COLUMN 21

Line 2, "The 107" should read --The controller 107--.

UNITED STATES PATENT AND TRADEMARK OFFICE
CERTIFICATE OF CORRECTION

PATENT NO. : 5,305,106

DATED : April 19, 1994

INVENTOR(S) : NOBUO FUKUSHIMA ET AL.

It is certified that error appears in the above-identified patent and that said Letters Patent is hereby corrected as shown below:

COLUMN 27

Line 43, "the" (second occurrence) should read --The--.

COLUMN 28

Line 60, "HREF" should read --$H_{REF}$--.

COLUMN 30

Line 25, "¢242" should read --242--.

COLUMN 31

Line 1, "circuit Ill" should read --circuit 111--.
Line 51, "the the" should read --the--.
Line 52, "integrated" should read --(integrated--.

UNITED STATES PATENT AND TRADEMARK OFFICE
CERTIFICATE OF CORRECTION

PATENT NO. : 5,305,106
DATED : April 19, 1994
INVENTOR(S) : NOBUO FUKUSHIMA ET AL.    Page 3 of 3

It is certified that error appears in the above-identified patent and that said Letters Patent is hereby corrected as shown below:

COLUMN 32

Line 46, "count;" should read --count; and--.

Signed and Sealed this

Thirteenth Day of December, 1994

Attest:

BRUCE LEHMAN

Attesting Officer    Commissioner of Patents and Trademarks